(12) United States Patent
Stein

(10) Patent No.: US 11,062,152 B2
(45) Date of Patent: *Jul. 13, 2021

(54) ROAD PLANE OUTPUT WITH LATERAL SLOPE

(71) Applicant: Mobileye Vision Technologies Ltd., Jerusalem (IL)

(72) Inventor: Gideon Stein, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 205 days.

This patent is subject to a terminal disclaimer.

(21) Appl. No.: 16/275,560

(22) Filed: Feb. 14, 2019

(65) Prior Publication Data

US 2019/0276007 A1    Sep. 12, 2019

Related U.S. Application Data

(63) Continuation of application No. 15/460,183, filed on Mar. 15, 2017, now Pat. No. 10,210,402.

(Continued)

(51) Int. Cl.
| | | |
|---|---|---|
| *B60W 10/20* | (2006.01) | |
| *G06K 9/00* | (2006.01) | |

(Continued)

(52) U.S. Cl.
CPC ......... *G06K 9/00798* (2013.01); *B60W 10/20* (2013.01); *B60W 10/22* (2013.01);

(Continued)

(58) Field of Classification Search
CPC ........... G06K 9/00791; G06K 9/00798; G06K 9/6202; G06T 2207/10004;

(Continued)

(56) References Cited

U.S. PATENT DOCUMENTS

| | | |
|---|---|---|
| 9,256,791 B2 | 2/2016 | Stein et al. |
| 10,210,402 B2 | 2/2019 | Stein |

(Continued)

FOREIGN PATENT DOCUMENTS

| | | |
|---|---|---|
| CN | 109154981 | 1/2019 |
| KR | 20140132979 | 11/2014 |

(Continued)

OTHER PUBLICATIONS

"European Application Serial No. 17721828.6, Communication Pursuant to Article 94(3) EPC dated Apr. 28, 2020", 6 pgs.

(Continued)

*Primary Examiner* — Siamak Harandi
(74) *Attorney, Agent, or Firm* — Schwegman Lundberg & Woessner, P.A.

(57) ABSTRACT

The present disclosure generally relates to processing visual data of a road surface that includes a vertical deviation with a lateral slope. In some embodiments, a system determines a path expected to be traversed by at least one wheel of the vehicle on a road surface. In some embodiments, a system determines, using at least two images captured by one or more cameras, a height of the road surface for at least one point along the path to be traversed by the wheel. In some embodiments, a system computes an indication of a lateral slope of the road surface at the at least one point along the path. In some embodiments, a system outputs, on a vehicle interface bus, an indication of the height of the point and an indication of the lateral slope at the at least one point along the path.

38 Claims, 12 Drawing Sheets

Related U.S. Application Data

(60) Provisional application No. 62/308,631, filed on Mar. 15, 2016.

(51) Int. Cl.
| | |
|---|---|
| *B60W 10/22* | (2006.01) |
| *B60W 30/02* | (2012.01) |
| *G06T 7/11* | (2017.01) |
| *G06T 7/246* | (2017.01) |
| *G06K 9/62* | (2006.01) |
| *G06T 7/60* | (2017.01) |
| *H04N 7/18* | (2006.01) |

(52) U.S. Cl.
CPC ......... *B60W 30/02* (2013.01); *G06K 9/00791* (2013.01); *G06K 9/6202* (2013.01); *G06T 7/11* (2017.01); *G06T 7/248* (2017.01); *G06T 7/60* (2013.01); *H04N 7/18* (2013.01); *B60W 2420/42* (2013.01); *B60W 2552/15* (2020.02); *B60W 2552/35* (2020.02); *B60W 2900/00* (2013.01); *G06T 2207/10004* (2013.01); *G06T 2207/20112* (2013.01); *G06T 2207/30256* (2013.01)

(58) Field of Classification Search
CPC . G06T 2207/20112; G06T 2207/30256; G06T 7/11; G06T 7/248; G06T 7/60; H04N 7/18; B60W 10/20; B60W 30/02; B60W 2552/15; B60W 2552/35; B60W 2420/42; B60W 2900/00
See application file for complete search history.

(56) References Cited

U.S. PATENT DOCUMENTS

| | | | | |
|---|---|---|---|---|
| 2015/0294161 | A1* | 10/2015 | Schamp | G06K 9/00798 701/37 |
| 2015/0317525 | A1 | 11/2015 | Stein et al. | |
| 2016/0253566 | A1 | 9/2016 | Stein et al. | |
| 2017/0270372 | A1 | 9/2017 | Stein | |
| 2017/0357861 | A1* | 12/2017 | Okuda | G06K 9/00805 |
| 2019/0184989 | A1* | 6/2019 | Matsumoto | G06K 9/00798 |

FOREIGN PATENT DOCUMENTS

| | | |
|---|---|---|
| KR | 102023297 | 9/2019 |
| WO | WO-2017158424 A1 | 9/2017 |

OTHER PUBLICATIONS

"European Application Serial No. 17721828.6, Response filed Jul. 16, 2020 to Communication Pursuant to Article 94(3) EPC dated Apr. 28, 2020", 11 pgs.
"U.S. Appl. No. 15/460,183, Non Final Office Action dated Jul. 26, 2018", 8 pgs.
"U.S. Appl. No. 15/460,183, Notice of Allowance dated Oct. 4, 2018", 8 pgs.
"U.S. Appl. No. 15/460,183, Response filed Sep. 6, 2018 to Non Final Office Action dated Jul. 26, 2018", 15 pgs.
"International Application Serial No. PCT/IB2017/000321, International Search Report dated Jun. 23, 2017", 4 pgs.
"International Application Serial No. PCT/IB2017/000321, Written Opinion dated Jun. 23, 2017", 8 pgs.
"Korean Application Serial No. 10-2018-7029556, Voluntary Amendment filed Oct. 18, 2018", w/ English claims, 21 pgs.
Jens, Rieken, et al., "Benefits of using explicit ground-plane information for grid-based urban environment modeling", The Institute of Electrical and Electronics Engineers, Inc. IEEE 18th International Conference on Information Fusion, (Jul. 1, 2015), 2049-2056.
Johannes, Michael, et al., "Pro-active optimal control for semi-active vehicle suspension based on sensitivity updates", Vehicle System Dynamics: International Journal of Vehicle Mechanics and Mobility, vol. 53, No. 12, (Sep. 22, 2015), 1721-1741.
Lucas, B. D, et al., "An iterative image registration technique with an application to stereo vision", Proceedings of the 7th International Joint Conference on Artificial intelligence—vol. 2, Proceedings DARPA Imaging Understanding Workshop, (Apr. 1981), 674-679.
Shen, Truman, et al., "Stereo vision based road surface preview", 17th International IEEE Conference on Intelligent Transportation Systems (ITSC), IEEE, (Oct. 8, 2014), 1843-1849.
"Korean Application Serial No. 10-2018-7029556, Response filed Apr. 23, 2019 to Notice of Preliminary Rejection dated Feb. 27, 2019", w English claims, 24 pgs.
"Chinese Application Serial No. 201780029603.6, Voluntary Amendment filed Apr. 30, 2019", w English claims, 17 pgs.
"European Application Serial No. 17721828.6, Response filed Apr. 1, 2019 to Communication Pursuant to Rules 161 and 162 dated Oct. 23, 2018", 14 pgs.
"Korean Application Serial No. 10-2018-7029556, Voluntary Amendment and PPH Request filed Feb. 13, 2019", w English claims, 43 pgs.
"Korean Application Serial No. 10-2018-7029556, Notice of Preliminary Rejection dated Feb. 27, 2019", w English Translation, 4 pgs.
"Korean Application Serial No. 10-2019-7026609, Notice of Preliminary Rejection dated May 12, 2021", w English translation, 10 pgs.

* cited by examiner

ROAD PLANE OUTPUT WITH LATERAL SLOPE

CROSS-REFERENCE TO RELATED APPLICATION

This application is a continuation of U.S. application Ser. No. 15/460,183, entitled "Road Plane Output with Lateral Slope," filed on Mar. 15, 2017, which claims the benefit of U.S. Provisional Application No. 62/308,631, entitled "Road Plane Output with Lateral Slope," filed on Mar. 15, 2016, the entire contents of which are incorporated herein by reference for all purposes.

This application is related to U.S. application Ser. No. 14/554,500 (now U.S. Pat. No. 9,256,791), titled "Road Vertical Contour Detection," filed Nov. 26, 2014; to U.S. application Ser. No. 14/798,575, titled "Road Contour Vertical Detection," filed Jul. 14, 2015; to U.S. Provisional Application No. 62/120,929, titled "Road Plane Profile Output in a Stabilized World Coordinate Frame," filed Feb. 26, 2015; to U.S. Provisional Application No. 62/131,374, titled "Road Plane Output in a Stabilized World Coordinate Frame," filed Mar. 11, 2015; to U.S. Provisional Application No. 62/149,699, titled "Road Plane Profile Output in a Stabilized World Coordinate Frame," filed Apr. 20, 2015; to U.S. Provisional Application No. 62/238,980, titled "Road Plane Output in a Stabilized World Coordinate Frame," filed Oct. 8, 2015; and to U.S. application Ser. No. 15/055,322, titled "Road Vertical Contour Detection Using a Stabilized Coordinate Frame," filed Feb. 26, 2016, the entire contents of which are incorporated herein by reference for all purposes.

FIELD

The present disclosure relates generally to driver assistance systems, and more specifically to detecting features of a road plane.

BACKGROUND

The use of driver assistance systems (DAS) has significantly increased in recent years, and only promises to continue. Driver assistance systems can be hardware and/or software components that assist with the driving or maneuvering of a vehicle. In some instances, a DAS can achieve fully autonomous control of a vehicle (e.g., no driver intervention is required during operation) or semi-autonomous control (e.g., some driver intervention is required during operation). In some instances, a DAS can perform in tandem with driver control (e.g., making minor corrections or providing useful information about road conditions). In some instances, the level of control of the DAS can be varied (e.g., by the driver) to be fully autonomous, semi-autonomous, in tandem control with the driver, or disabled. Some examples of DAS functions include lane departure warning (LDW), automatic high-beam control (AHC), traffic sign recognition (TSR) and forward collision warning (FCW).

Many DAS systems rely on one or more cameras to capture images of the vehicle's surroundings, for example, for determining features in a road plane (e.g., on the image plane of an imaged road surface). Some techniques for determining features in a road plane do not correctly detect features under certain conditions. As a result, a vehicle traveling under the control of a DAS system may not make the proper adjustments to address the actual road plane features, causing adverse effects to the ride, comfort, and/or safety of the trip.

BRIEF SUMMARY

Accordingly, the techniques provided herein allow for improved determination of features in a road plane, particularly features having a lateral slope.

In some embodiments, a method for processing visual data of a road surface is performed, the method comprising: accessing visual data representing a road surface; determining an initial road profile of the road surface, wherein the road profile is derived from residual motion along a vehicle path associated with the road surface; segmenting a portion of the visual data representing the road surface into a first segment and a second segment, wherein the portion of the visual data that is segmented includes visual data representing an vertical deviation on the road surface; determining a first segment road profile for the first segment of the portion of the visual data; determining a second segment road profile for the second segment of the portion of the visual data; comparing one or more of the first segment road profile, the second segment road profile, and the initial road profile; and based at least in part on results of the comparison, outputting an indication of a lateral slope of the vertical deviation on the road surface.

In some embodiments, a system for processing visual data of a road surface, the system comprises: one or more processors; memory; and one or more programs, wherein the one or more programs are stored in the memory and configured to be executed by the one or more processors, the one or more programs including instructions for: accessing visual data representing a road surface; determining an initial road profile of the road surface, wherein the road profile is derived from residual motion along a vehicle path associated with the road surface; segmenting a portion of the visual data representing the road surface into a first segment and a second segment, wherein the portion of the visual data that is segmented includes visual data representing an vertical deviation on the road surface; determining a first segment road profile for the first segment of the portion of the visual data; determining a second segment road profile for the second segment of the portion of the visual data; comparing one or more of the first segment road profile, the second segment road profile, and the initial road profile; and based at least in part on results of the comparison, outputting an indication of a lateral slope of the vertical deviation on the road surface.

In some embodiments, a non-transitory computer-readable storage medium stores one or more programs, the one or more programs comprising instructions, which, when executed by one or more processors of a vehicle, cause the processors to: access visual data representing a road surface; determine an initial road profile of the road surface, wherein the road profile is derived from residual motion along a vehicle path associated with the road surface; segment a portion of the visual data representing the road surface into a first segment and a second segment, wherein the portion of the visual data that is segmented includes visual data representing an vertical deviation on the road surface; determine a first segment road profile for the first segment of the portion of the visual data; determine a second segment road profile for the second segment of the portion of the visual data; compare one or more of the first segment road profile, the second segment road profile, and the initial road profile;

and based at least in part on results of the comparison, output an indication of a lateral slope of the vertical deviation on the road surface.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

1. Overview

As described briefly above, driver assistance systems can rely on one or more imaging devices to collect visual data of a road plane around the vehicle. This visual data can be used, in turn, to determine structural properties of the environment of the vehicle, including features of a road surface, objects or obstacles on the road surface, or other vertical deviations of the road surface. The term "plane" as used herein is not limited to a purely geometric plane (i.e., flat, two-dimensional), but is used in a general sense. Thus, for example, a "road plane" (which may also be referred to as a "road surface") can be substantially flat but include three-dimensional components.

Certain existing methods for detecting the vertical deviation of a contour of a road using a vehicle-mounted camera are known. Certain previously known algorithms can be summarized as follows:

1. A first pair of two consecutive frames captured by a vehicle-mounted camera are aligned using a homography of the road. This gives the ego-motion (rotation R and translation T) between the frames. For example, a grid of points (e.g., as in FIG. 1) in the image are tracked and used to compute the homography.
2. A second pair of frames is then selected, the current frame and the nearest previous frame representing a point in time from which the vehicle has currently moved over a minimum threshold distance. A chaining of the first pair of frames (the consecutive frames) is used to create an initial guess of the homography, and a more accurate homography for the second pair of frames is then computed, and the reference plane is determined.
3. The path of the vehicle is then projected onto the image plane shown by the lines in FIG. 2). Strips along each path are used to compute the residual motion, which gives the profile relative to the reference plane determined. FIG. 3 shows a normalized correlation score for a strip 31 pixels wide along the path of the left wheel for vertical motion ±6 pixels. A small curvature can be seen, indicated by the arrow. This curvature represents the small residual motion indicative of a speed bump.
4. Finally, the residual motion is translated into a metric distance and height, and is combined into a multi-frame model. The results are shown in the upper graphs in FIG. 2.

Figure 1:
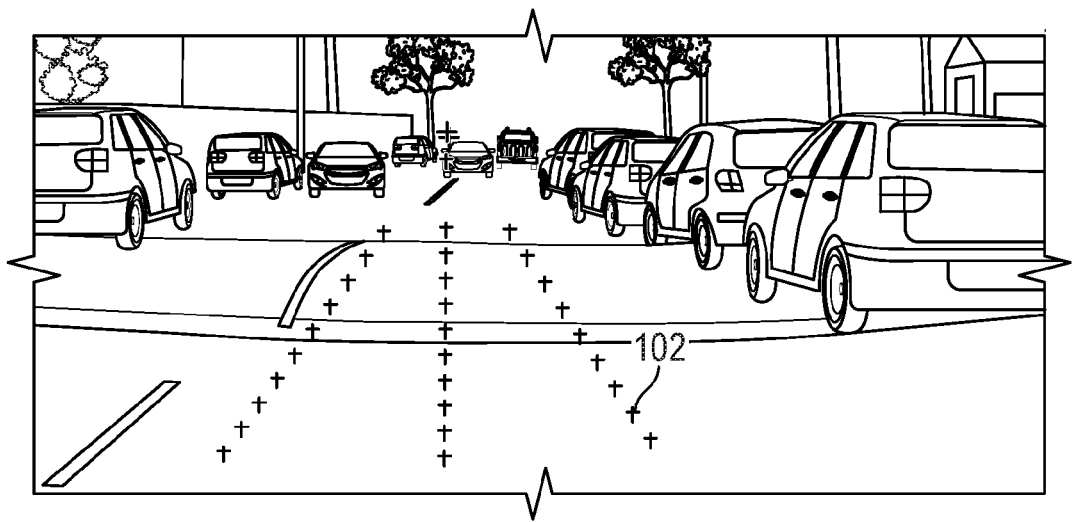
FIG. 1 depicts an exemplary grid of points used to compute a homography.
Figure 2:
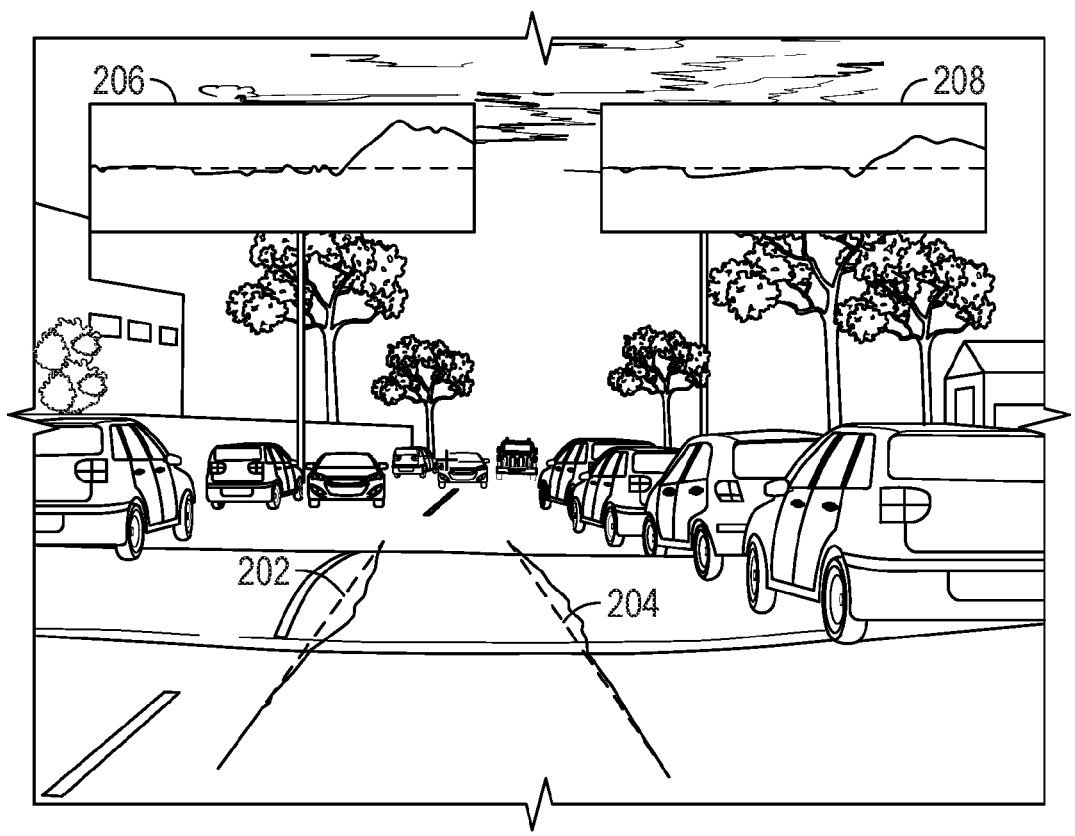
FIG. 2 depicts a camera view that includes residual motion for points along predicted wheel paths and plots of metric height and distance.
Figure 3:
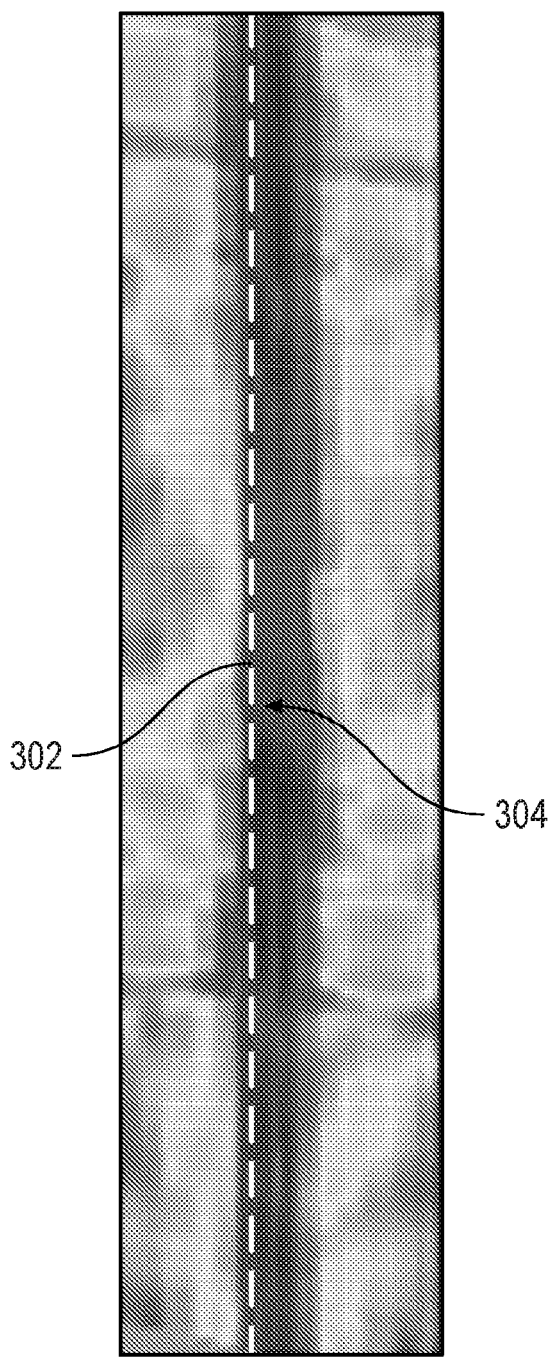
FIG. 3 depicts the normalized correlation score for points along a wheel path.

FIGS. 1-3 illustrate the use of visual data of a speed bump on a road surface. FIG. 1 illustrates a grid 102 comprised of 33 points, overlaid on an image, which are tracked and used to compute a homography. In some examples, two consecutive image frames are aligned using a homography of the road. In other examples, non-consecutive image frames can be used. For instance, two images frames captured several frames apart (e.g., with one or more intervening captured frames between the two image frames) can be used to provide a larger baseline for the homography. Aligning the image frames is also referred to as warping the second (earlier) image frame towards the first. A homography can be used to determine structure from motion data using image frames.

In some e samples, the ego motion (rotation R and translation T) of a camera between the frames is also determined using a homography. In some embodiments, the ego motion is determined using one or more sensors on the vehicle. In some embodiments, the ego motion is determined using one or more image processing techniques. For example, image processing can include computing the ego motion from two or more image frames and a road model. In some examples, a planar (0% grade) road surface is assumed for the road model ([0,0,1] is good for normal vehicle speed and calibrated camera height), but other road models can be used. Examples of other road models include, but are not limited to, a 1% inclining road, a 2% declining road, and the like. A more complex road surface can be modeled and used, including a road model with varying road grade, a road model of an uneven road surface, or the like. Given the road model, an image point can be projected to a 3D point on the road model.

As used herein, and unless otherwise noted, "on" a vehicle refers to attachment, placement, positioning, mounting, or the like, within a vehicle, outside of a vehicle (e.g., attached to the body), or otherwise in contact with a portion of the vehicle. For example, a component mounted on a windshield inside of the vehicle is intended to be within the scope of the phrase "on", as is a component affixed or otherwise mounted to the exterior of the vehicle.

In some examples, the points in the grid can be spaced evenly in the image, which gives more points close to the vehicle. In some examples, the points can be spaced evenly in distance which will give points more concentrated higher in the image. In other examples, the points are evenly spaced vertically in the image and greater weight is given to the more distant points, for example, in a least squares computation of the homography.

In some embodiments, the system accesses two image frames, where there was forward translation of the vehicle over a minimum threshold, and uses chaining of the consecutive frames to determine an initial homography. A more accurate homography is then computed and the reference plane is determined. In some embodiments, the system accesses a number of image frames other than two. For example, any number of image frames can be used to determine the initial homography and/or the more accurate homography (also referred to as a refined homography).

FIG. 2 illustrates exemplary visual data of a road surface, captured by an imaging device of a driver assistance system. FIG. 2 includes vehicle path data projected into the image plane of the road surface (also referred to as the road plane). Vehicle paths 202 and 204 represent the respective paths of a vehicle's left and right wheels, and are depicted as dotted lines overlaid on the image. Strips along each vehicle path are used to compute the residual motion. The residual motion can be used to represent the profile of the road relative to an image plane (e.g., a reference plane) of the imaged road surface.

A vehicle path, such as 202 and 204, is a virtual representation of an actual path on a road surface over which a vehicle has or will travel. In some embodiments, a "virtual" vehicle path has a width of one or more pixels. In some examples, the width of a vehicle path is a constant number of units (e.g., pixels). In other examples, a vehicle path has a non-constant width. In some embodiments, the width of a "virtual" vehicle path relates to the width of an actual path. For example, the width associated with an actual path can be based on an actual vehicle tire width (or other point of contact between a vehicle and a road surface), can be based on an average tire width, can be predetermined based on user input, can be a center line of a tire track (independent of a tire width), or based on any other suitable value.

FIG. 3 illustrates the normalized correlation scores for an image strip that is 31 pixels wide along the vehicle path of the left wheel (path 202) for vertical motion ±6 pixels. The normalized correlation scores, such as those illustrated in FIG. 3, can indicate a deviation or shift (e.g., in number pixels) that is needed to align each given row of a second image frame with a first image frame. In Ha 3, the darker portions indicate higher correlation, wherein the vertical axis (e.g., y-axis) represents rows of pixels (each 31 pixels wide), and the horizontal axis (x-axis) represents vertical motion in pixels. A slight curvature can be seen in the darkened portion. Straight line 302 is overlaid on top of the normalized correlation scores, for reference. Using line 302 as a reference, the small curvature (indicated by arrow 304) can be seen. This curvature indicates residual motion, and the presence of a vertical deviation on the imaged road surface, such as a contour or an obstacle (e.g., a speed bump).

Techniques for determining the presence of road vertical contours are described in more detail in U.S. application Ser. No. 14/554,500 (now U.S. Pat. No. 9,256,791), titled "Road Vertical Contour Detection," filed Nov. 26, 2014; U.S. application Ser. No. 14/798,575, titled "Road Contour Vertical Detection," filed Jul. 14, 2015; and U.S. application Ser. No. 15/055,322, titled "Road Vertical Contour Detection Using a Stabilized Coordinate Frame," filed Feb. 26, 2016, the contents of which are incorporated herein by reference.

In some embodiments, the residual motion along one or more vehicle paths is translated into metric distance and metric height and combined into a multi-frame model (which may also be referred to as a multi-frame profile). A multi-frame model refers to a model that is created by aligning multiple image frames (e.g., frames representing different moments in time as a vehicle traverses a portion of road) with a global model to combine road profiles that correspond to an overlapping portion of the roadway. In this example, exemplary road profiles for left and right wheel vehicle paths are shown in the plots in the upper portion of FIG. 2, plot 206 and plot 208, respectively. In some embodiments, one or more road profiles (individually or combined into a multi-frame model) are sent over a communication bus, such as a Controller Area Network (CAN) bus.

Additional description and algorithms for determining multi-frame models are found in U.S. application Ser. No. 14/554,500 (now U.S. Pat. No. 9,256,791), titled "Road Vertical Contour Detection," filed Nov. 26, 2014; and U.S. application Ser. No. 14/798,575, titled "Road Contour Vertical Detection," filed Jul. 14, 2015, the contents of which are incorporated herein by reference.

A stabilized world reference can be used to provide a consistent road profile with a very compact representation denoted as a 1D profile. A lateral slope computation, as described later in this document, can be used with either representation: the full profile or the compact 1D profile.

A brief description of calculating a stabilized world reference is included below, however, further description is found in U.S. application Ser. No. 15/055,322, titled "Road Vertical Contour Detection Using a Stabilized Coordinate Frame," filed Feb. 26, 2016, the content of which is incorporated herein by reference. In some embodiments, a stabilized world coordinate frame is calculated based at least on the combination of (a) a reference plane calculated in accordance with the current frame, (b) a reference plane calculated in accordance with one or more previous frames and (c) an assumed default reference plane based at least in part on the fixed position of the camera relative to the vehicle. The combination of those factors can, in some embodiments, yield a stabilized world coordinate frame that is used to compare frames corresponding to different steps in time in order to calculate residual motion and recognize vertical deviations in the surface of the roadway.

A brief description of generating a profile using a 1D sampling technique is included below, however, further description is found in U.S. application Ser. No. 15/055,322, titled "Road Vertical Contour Detection Using a Stabilized Coordinate Frame," filed Feb. 26, 2016, the content of which is incorporated herein by reference.

In some embodiments, transmitting data for a road profile for a portion of the road in front of a vehicle can require transmission of a large number of values. For example, the road profile output from 5 meters to 12 meters in front of a vehicle, sampled every 0.05 meters, requires 140 values; the number of required values is obviously even greater for a longer profile. The large numbers of values that may be required can be problematic for the controller area network (CAN), and may require significant computational resources on the receiving end. For example, in some embodiments, 200 data points may be transmitted per wheel per frame, which may require over 1 KB of data to be transmitted per frame. In some embodiments, transmitting this amount of data for every frame may be unfeasible and/or too computationally expensive for the receiving system.

Furthermore, some DAS and self-driving systems require the receipt of data at a predefined frame rate, such as 100 Hz, such that the system calls for one data point corresponding to a height of the road (at a predetermined distance in front of the vehicle) every 10 milliseconds. In some embodiments, sending data to a system every 10 milliseconds may be unfeasible because it may monopolize data channels in a vehicle, such that other information is unable to be sent over the same data channels.

It is thus beneficial to transmit computationally efficient amounts of data regarding road profiles in such a manner that (a) the total amount of data sent is computationally manageable and (b) not monopolize data channels at all points in time.

In some embodiments, a data format for sending information about road profiles is provided in which the road height is output at a particular distance in front of a wheel. In some embodiments, the distance is a fixed distance (e.g., 7 meters), and in some other embodiments the distance may be dynamically determined. For example, the distance in front of the wheel may be dynamically determined in accordance with a speed of the vehicle, increasing the reference distance at higher speeds. In some embodiments, the distance may be set in accordance with the distance covered by the vehicle in a given amount of time (e.g., the distance covered by the vehicle at its current speed in 0.5 seconds). Rather than conveying an entire profile, or profile data relating to the road height along the entire known wheel path at each time step, merely sending data corresponding to a certain fixed distance in front of the wheel allows for less total data to be transmitted, which may conserve computational resources and bandwidth.

In some embodiments, a data format is further provided in which, instead of just one point of data, multiple data points are transmitted substantially simultaneously, to effectively multiply the frame rate. For example, if the frame rate is 10 Hz, a system may in some embodiments simulate the output of data at 100 Hz by sending 10 data points at once, in a burst, at a true frequency of 10 Hz. After transmission, the receiving component may unpack the 10 data points and consult them one at a time, as successively required. In some embodiments, all data points corresponding to a single frame may be transmitted in a single data transmission, while in some embodiments they may be transmitted in multiple transmissions which number fewer than the number of data points per frame (e.g., 7 data points per frame sent in just two CAN messages). In some embodiments, fewer than 10 data points may be sent per burst. In some embodiments, 16 data points may be sent per burst.

From the data points in the burst, a compact 1D profile can be determined. In some embodiments, a system may determine a distance that the host vehicle is anticipated to travel in the time that corresponds to the frequency at which data will be sent. In some embodiments, the system may sample a road profile at n points along the projected path of a wheel, where n is the number of data points per burst. In some embodiments, the points at which the road profile is sampled may be spaced between (e.g., may span from, or may be spaced evenly between) the selected distance in front of the wheel and that distance plus the estimated distance the vehicle will travel before the next data burst is sent. In some embodiments, a road profile may be sampled at points along a path segment that extends beyond the selected distance in front of the wheel plus the estimated distance the vehicle will travel before the next data burst is sent; in this way, there may be some overlap between the portions of the road corresponding to data bursts from different frames, creating redundancy which in some embodiments may improve accuracy of vertical deviation calculations.

Attention is now turned to examples that illustrate specific real-world cases that a driver assistance system can encounter. Briefly, the first example presented below illustrates the simple case in which a vehicle path (e.g., of a vehicle wheel) passes over the center of a bump on the road surface, wherein the hump has an approximately even lateral height (e.g., the entire width of the vehicle wheel will experience the height of the bump). The second example presented below illustrates a more difficult case for a driver assistance system in which a vehicle path passes over a portion of the road plane that has a lateral slope (e.g., such as the edge of a bump or other obstacle). In this second example, a typical vehicle navigation system may simply treat the portion with the lateral slope as a simple bump (e.g., the same as in the first example), or not may not treat it as a bump at all (e.g., an average detected height of the bump, over the width of the vehicle wheel, will be lower than in the first example, which may not cause the bump to register as a significant obstacle to the driver assistance system).

Example 1

Vehicle Path Passing Completely Over an Obstacle

Figure 5A:
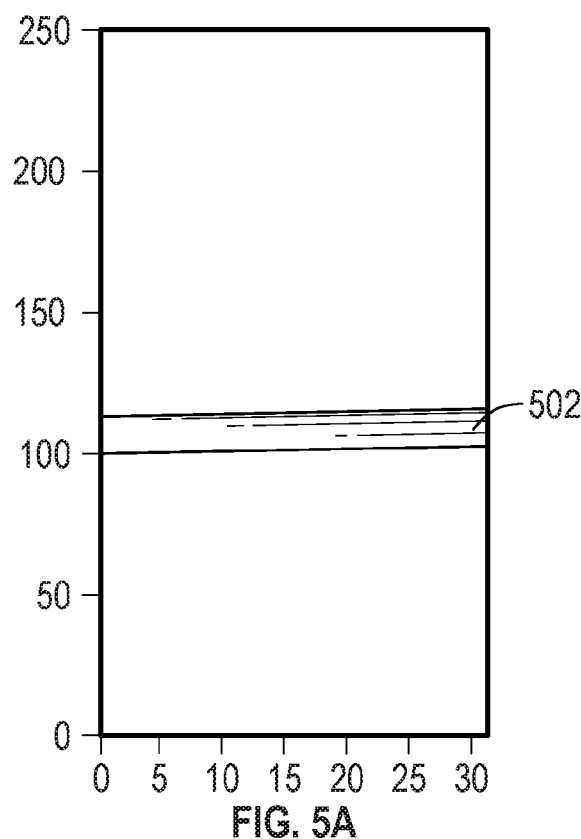
FIG. 5A depicts an image strip used to compute a road profile when a path is over the center of a speed bump.
Figure 5B:
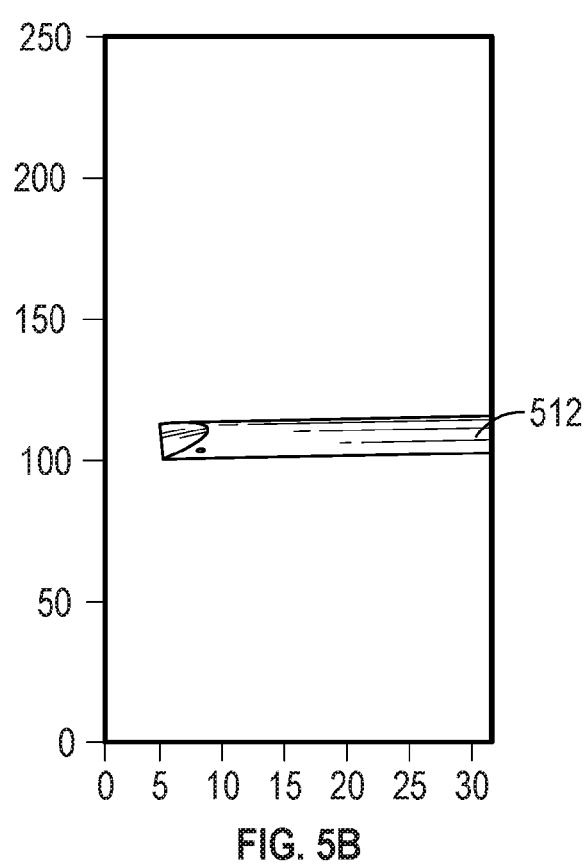
FIG. 5B depicts an image strip used to compute a road profile when a path is over the edge of a speed bump.
Figure 6:
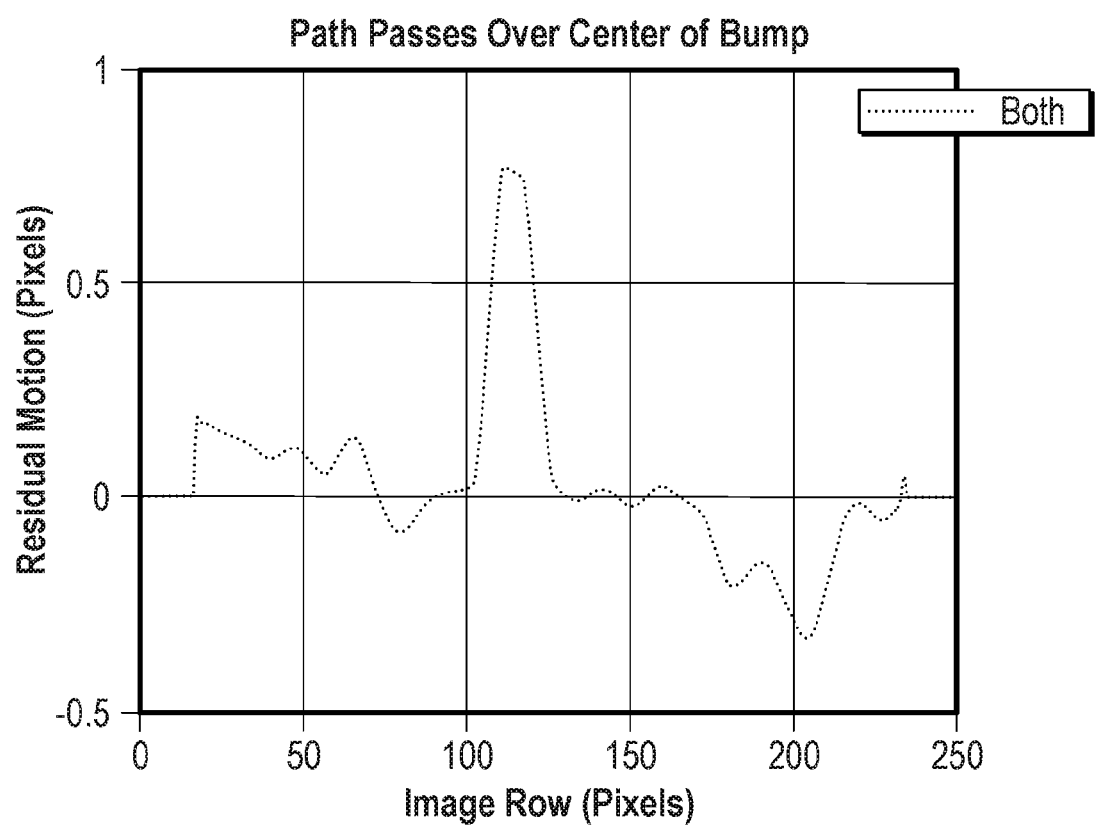
FIG. 6 depicts a plot of residual motion of a vehicle path computed for an image strip when a path is over the center of a speed bump.

FIGS. 4-6 illustrate visual data and measurements for the first example. As described above, this first example illustrates a situation in which a driver assistance system detects that a vehicle path (e.g., of a vehicle wheel) passes over the center of an obstacle (e.g., a bump) having an approximately even lateral height on both sides of the vehicle path.

Figure 4A:
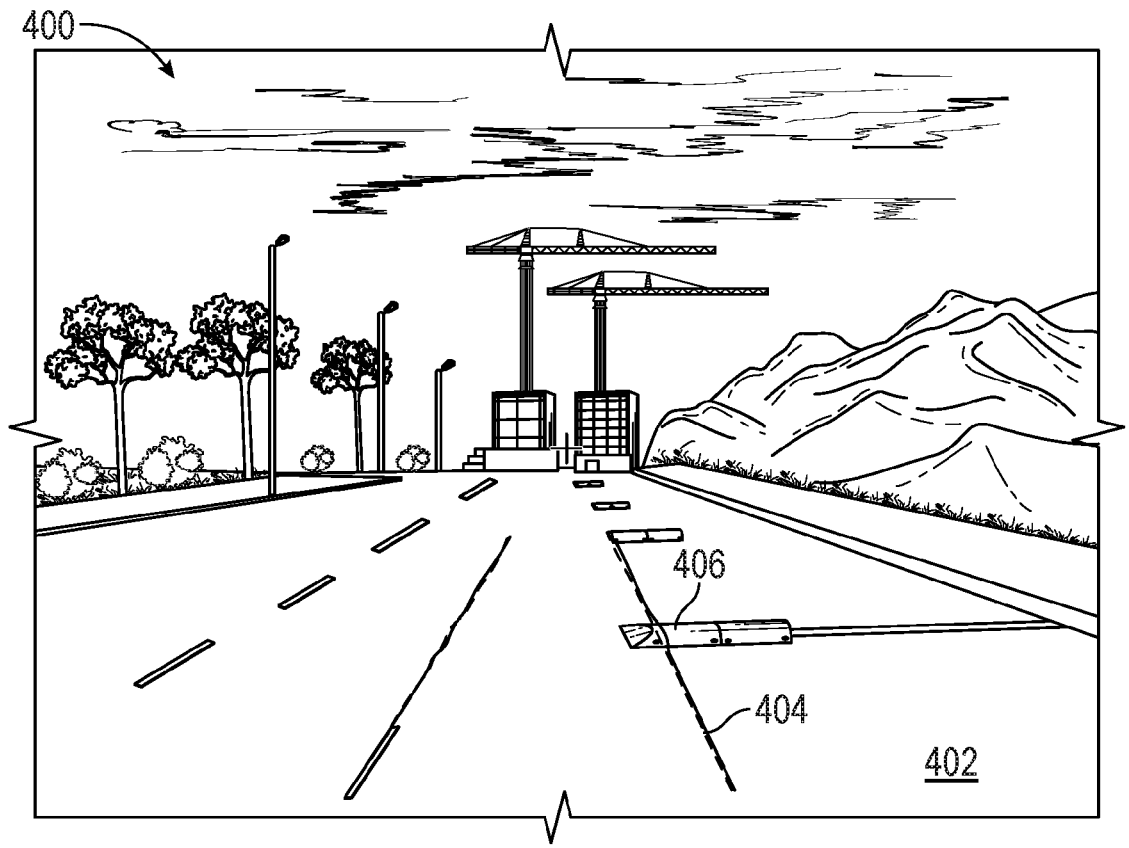
FIG. 4A depicts a camera view in which an overlaid right wheel path passes over the center of a speed bump.
Figure 4A:
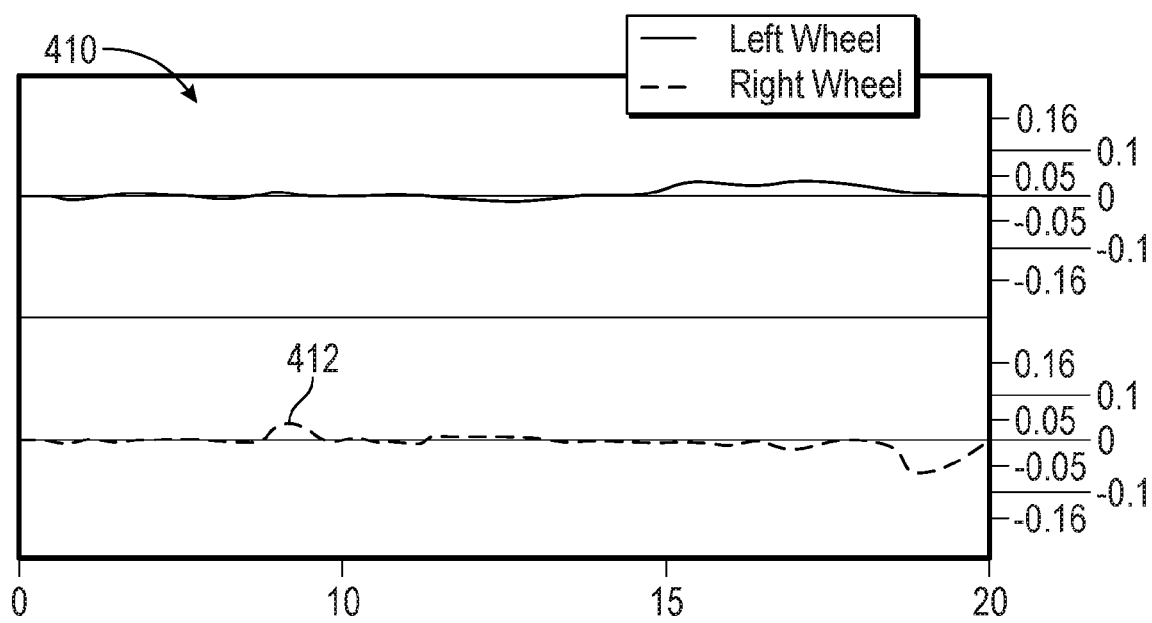

FIG. 4A illustrates visual data received by a driver assistance system. The visual data includes a representation of road surface 402, on which the vehicle is traveling. FIG. 4A also includes, superimposed on the visual data, a vehicle path 404 corresponding to the right wheel of the vehicle. Included on the vehicle path 404 is a measure of the residual motion of the road surface along the vehicle path. FIG. 4A also depicts speed bump 406 on road surface 402. As can be seen, vehicle path 404 passes completely over bump 406, which appears to have an approximately even lateral height on each side of vehicle path 404. Notably, where vehicle path 404 passes over bump 406, the overlaid residual motion on path 404 deflects upward. This upward deflection in the graphical representation of residual motion represents the presence of a bump (e.g., or other object, feature, obstruction, or the like) on the road surface. The data representing the residual motion of the road surface can be used to compute a road profile.

In some embodiments, a road profile is the height of the road along a path where the wheels will travel. In some examples, the height is the height relative to some reference plane. The road profile is computed from the residual motion, for example, by converting residual motion in pixels to a measure of distance applicable to the road surface (e.g., centimeters). In some examples, a road profile can be expressed in pixels.

FIG. 4A also includes plot 410, depicting the residual motions of the vehicle's left wheel (top of plot 410) and of the vehicle's right wheel (bottom of plot 410). Arrow 412 indicates the portion in the residual motion data that represents bump 406. Note the upward deflection of the residual motion plot at arrow 412, which occurs at about a distance of 8 meters (e.g., from the vehicle).

Figure 4B:
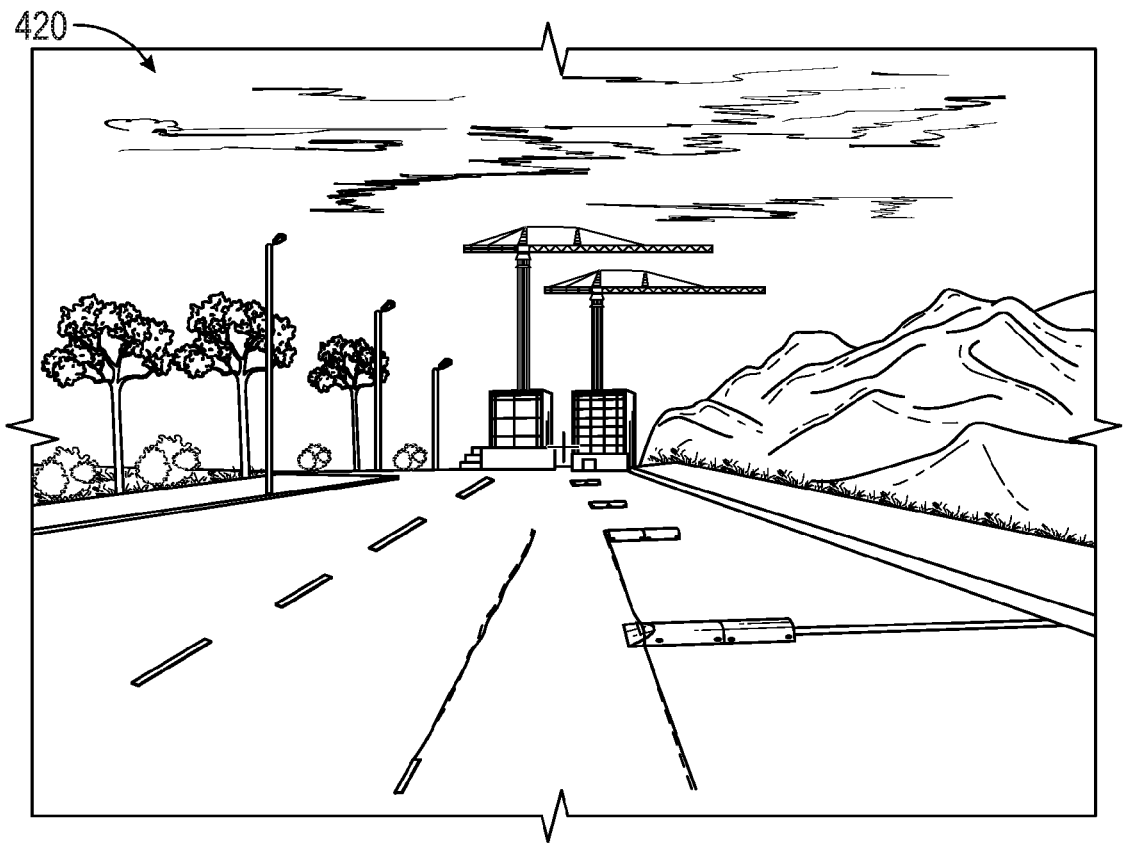
FIG. 4B depicts a camera view in which an overlaid right wheel path passes over the edge of a speed bump.
Figure 4B:
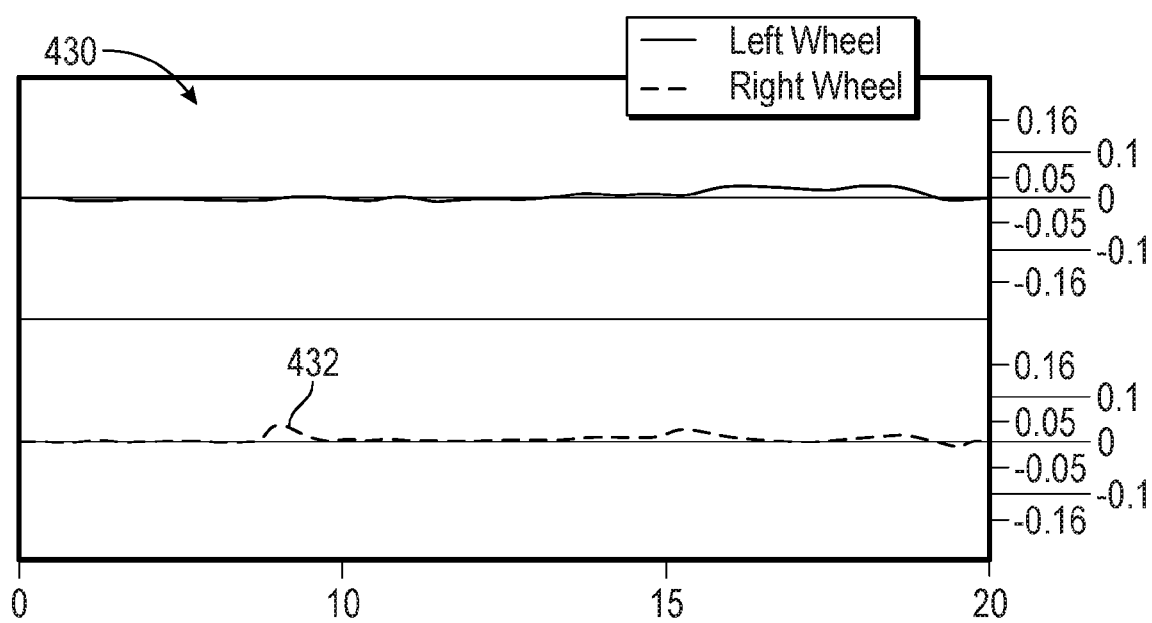

FIG. 4B is similar to FIG. 4A, but depicts the case in which the vehicle path passes over the edge of the speed bump. FIG. 4B is included to show an analysis made by a prior driver assistance system, presented here by way of example. Plot 430 depicts the road profile determined by the prior driver assistance system. Arrow 432 indicates the presence of speed bump 406. When compared, the graphically-shown residual motions indicated by arrow 412 (FIG. 4A) and arrow 432 (FIG. 4B) appear very similar. That is, the profile plot shows a similar bump and gives no indication that the wheel path is half on and half off the bump. Thus, a driver assistance system presented with the situations depicted in either FIGS. 4A and 4B may treat them both the same. However, the lateral slope of the edge of the bump that is passed over in FIG. 4B may go undetected, preventing the driver assistance system (or other vehicle components) from making appropriate adjustments or taking appropriate action. It would be appreciated that the example illustrated by FIGS. 4A and 4B provides just one non-limiting example of a scenario where embodiments of the present invention, and the algorithms implemented by it, react and behave differently than prior art solutions.

FIG. 5A depicts an image strip used to compute the road profile depicted in FIG. 4A. In particular, FIG. 5A shows a strip that is used for detecting the bump, the strip being 31 pixels wide (e.g., 15 pixels on each side of the vehicle path, plus 1 pixel representing the center of the vehicle path). The speed bump 502 is clearly visible for the entire width of the strip, beginning near row 100. In some embodiments, the length of a strip represents a distance in front of a vehicle. For example, a strip can represent the visual data from a distance of 5 meters in front of the vehicle to a distance of 20 meters in front of a vehicle along a vehicle path. In some embodiments, this distance can be constant. In some embodiments, this distance can be variable. For example, the distance represented by the length of an image strip can be variable and depend on one or more conditions, such as vehicle speed. Similarly, the width of a strip (e.g., in pixels) can be constant or variable. Generally, a strip with more pixels requires more computational resources to process.

Note that the diagonal path of vehicle path 404 in FIG. 4A has been straightened (e.g., to be vertical), for more efficient processing. In accordance with some embodiments, a vehicle path is not straightened before processing. This strip can be 'straightened' by shifting each row so that the center of the path forms a straight line.

Techniques related to creation and straightening of image strips are described in further detail in U.S. application Ser. No. 14/554,500 (now U.S. Pat. No. 9,256,791), titled "Road Vertical Contour Detection," filed Nov. 26, 2014; and U.S. application Ser. No. 14/798,575, titled "Road Contour Vertical Detection," filed Jul. 14, 2015, the contents of which are incorporated herein by reference.

FIG. 5B depicts the image strip used to compute the road profile depicted in FIG. 4B. In particular, FIG. 5B shows a strip that is used for detecting the bump. The speed bump covers just more than half the width of the strip from column 12 to column 31, however from columns 1 to 12 the strip is flat road. Using the strip depicted in FIG. 5B for a road profile computation can lead to uncertain or unsatisfactory results. The results can depend on the strength of the textures on the road and the bump. If the road texture is strong the bump might appear flat. If the bump texture dominates, the result can be detection of the bump, as seen in the case of FIG. 4B. In some cases the result can be an average. This uncertainty is undesirable.

For example, the vehicle's experience, and its effect over a riders in the vehicle, when the vehicle drives such a path with the wheel half on and half off of a speed bump (or an object on the road) can depend on various factors, including factors related to the vehicle's weight distribution, the vehicle's suspension, the vehicle's speed, etc. It could be that the effect over the vehicle can be sensitive to the exact path of the vehicle, for example, within a few centimeters. Thus, it would be advantageous to be able to differentiate between the case where the path is completely on a bump or flat road and the case where the wheel path is close to the edge of an object or obstacle on the road surface. Optionally, the profile can be given a low confidence if it passes on the edge of a speed bump (or any other object). In some examples, the suspension control might have a specific response to a partial bump, and the profile estimation system can provide an appropriate indication to the suspension control system to thereby allow the suspension control system to activate the specific partial bump response. A partial bump might also give a lateral deflection force on the car and steering control might also benefit from knowledge that such a force is going to occur. In such a case, the profile estimation system can provide an appropriate indication to the steering control. If the vehicle has some form of automatic steering, the profile estimation system can provide an indication of a partial bump, and the automatic steering control can be configured to subtly (as necessary) adjust the path of the vehicle, for example, so that the wheel path does not go over the bump at all.

FIG. 6 depicts an exemplary plot of residual motion of a vehicle path for the example in FIG. 4A, in which the vehicle path passes over the center of the bump. The plot 600 depicts the residual motion of the road plane along vehicle path 404 (measured in increments of image row pixels). As can be seen in FIG. 6, the residual motion of the path along the center of the image strip depicted in FIG. 5A includes a sharp increase that begins around pixel number 100. The resulting peak represents the bump.

Example 2

Vehicle Path Passing Partially Over an Obstacle

FIGS. 7-10 illustrate visual data and measurements for the second example. As described above, this second example illustrates a situation in which a driver assistance system detects that a vehicle path (e.g., of a vehicle wheel) passes partially over a bump having an even lateral height.

Figure 7:
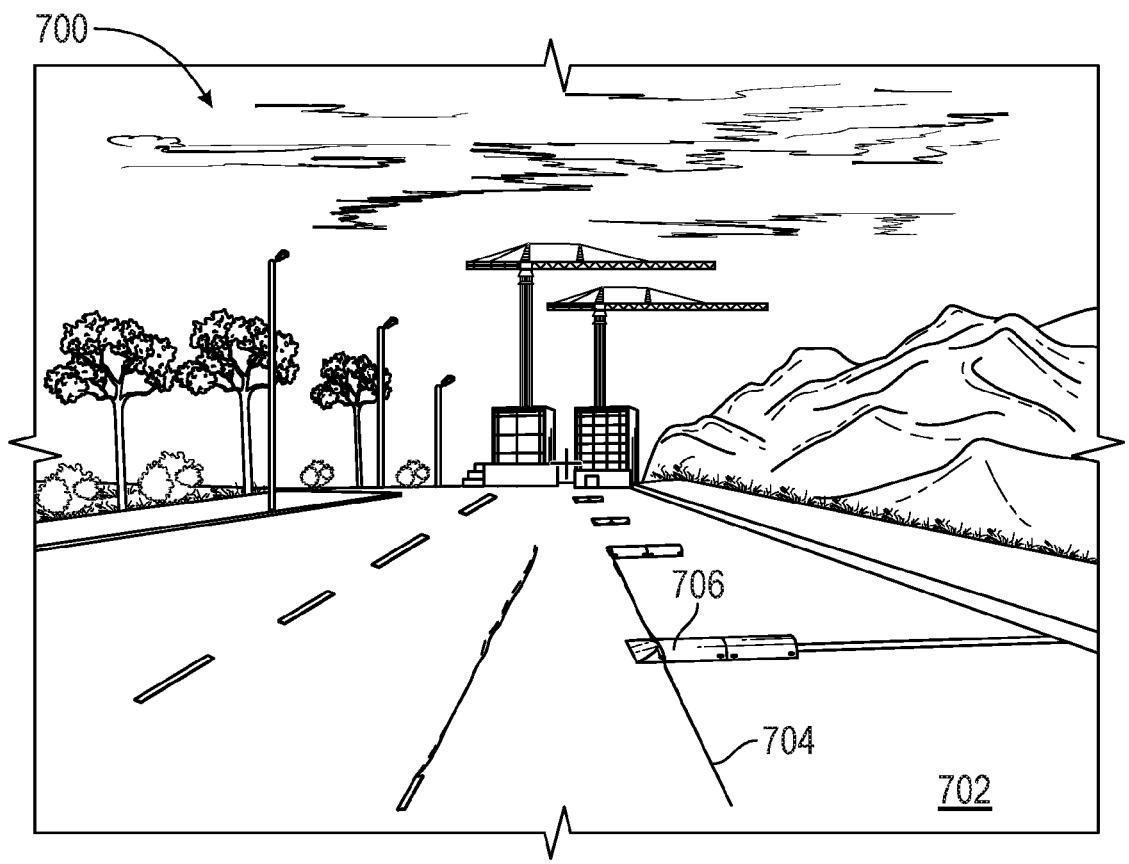
FIG. 7 depicts a camera view in which an overlaid right wheel path passes over the edge of a speed bump.

FIG. 7 illustrates exemplary visual data received by (or otherwise captured by) a driver assistance system. The visual data includes a representation of road surface 702, on which the vehicle is traveling, and corresponds to road surface 402. FIG. 7 also includes, superimposed on the visual data, a vehicle path 704 corresponding to the right wheel of the vehicle. Included on the vehicle path 704 is a measure of the residual motion of the road plane along the vehicle path. FIG. 7 also depicts speed bump 706 on road surface 702. Bump 706 corresponds to bump 406, which appears to have an approximately even lateral height. Notably, however, in this example vehicle path 704 instead passes over the edge of bump 706. Where vehicle path 704 passes over bump 706, the overlaid residual motion on path 704 deflects upward.

The upward deflection shown in FIG. 7 is the same upward deflection shown in FIG. 4B, calculated according to prior techniques. As noted above however, calculating residual motion of road features in situations such as the one presented in FIG. 7 can result in uncertain or unsatisfactory results. Embodiments of a technique for improved processing of a road plane with lateral slope are presented below.

Figure 8:
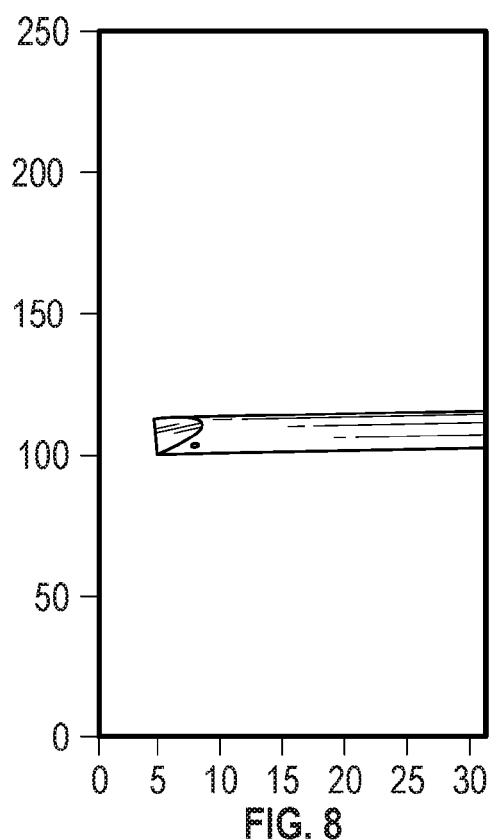
FIG. 8 depicts an image strip used to compute a road profile when a path is over edge of a speed bump.

FIG. 8 illustrates an example road strip used to determine a road profile. FIG. 8 corresponds to the image strip of FIG. 5B, and is used for detecting the bump on the road surface (e.g., road surface 702). The speed bump covers just more than half the width of the strip from column 12 to column 31, however from columns 1 to 12 the strip is flat road. Recall that in the example described with respect to FIG. 5A, the residual motion for image strip is determined for a vehicle path passing through the center of the image strip.

The size of the strip (width), and of the segments described below, can be set or can be selected according to certain parameters including for example, the speed of the vehicle, the reaction time and other operational parameters of the vehicle's suspension system, the frame rate of the camera, the distance at which the system is capable of reacting (or react optimally) to detected obstacles, etc.

The longitudinal extent (length) of the strip can also be predefined or it can be selected according to certain parameters (in case of predefined settings, such predefined setting can also be selected according to the following parameters). For example, the lateral extent of the strip can be selected according to the speed of the vehicle, the distance to the candidate (or object) and the frame rate. Further by way of example, the lateral extent of the strip can be selected such that each candidate (or object) is captured at least in two (typically consecutive) frames. For example, for a vehicle traveling at a speed of 100 kilometers per hour, the lateral extent of the strip can be, at minimum, 150 pixels, such that the candidate obstacle will be captured in at least strips from two consecutive image frames. It would be appreciated that the reference to two consecutive image frames as a possible parameter that can be used in determining the lateral extent of an image frame strip is made by way of example only, and that other length of image frame strips can be used, include for example a length that would provide for capturing the candidate in three (or four, etc.) consecutive image frames.

Figure 9:
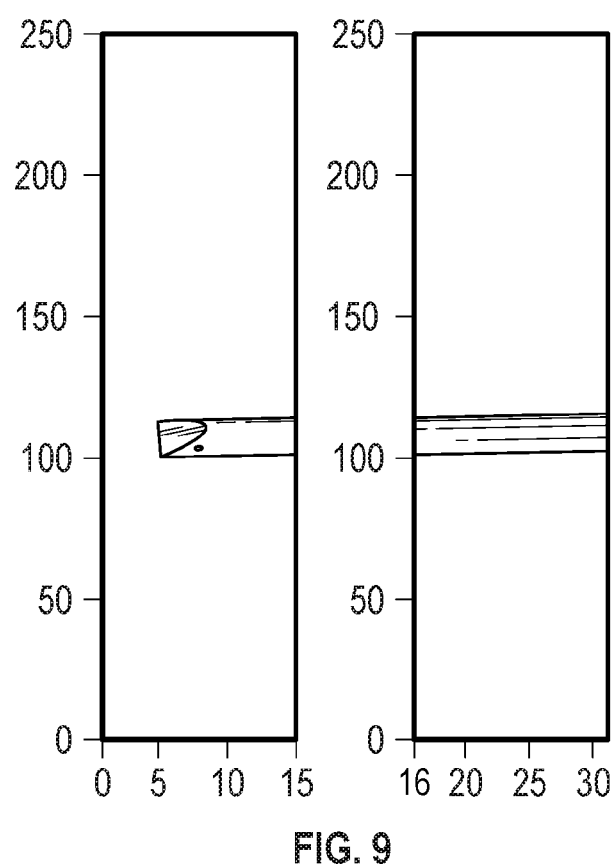
FIG. 9 depicts a segmented image strip used to compute a road profile when a path is over the edge of a speed bump.

Rather than treating the image strip of FIG. 8 as a single image strip for processing, the image strip can be segmented. In some embodiments, the image strip is segmented into two strips. FIG. 9 depicts two exemplary segments, a left strip (that includes pixels 0 to 15 of the image strip) and a right segment (that includes pixels 16-31 of the image strip). Thus, the image of FIG. 8 has been split roughly in half longitudinally (vertically in the image) the left segment includes (for each row width) pixels 1-15, and the right segment includes (for each row width) pixels 16-31. It would be appreciated that the image strip (or patch) can be segmented to any number of segments (e.g., two, three, . . . , n segments), where each segment includes two or more pixels. In some examples, a segmented strip can be further segmented. In yet another example, the original image strip can be segmented into a plurality of segments that partially overlap, but that do not include a direct segmentation of other segments. For example, the image strip can be segmented into two segments of one half, as well as into three segments of one third each. Any other appropriate segmentation of images is envisioned.

In some embodiments, residual motion is computed over the whole strip as before, but is also computed for each partial strip (segment) separately. In some embodiments, residual motion is computed for less than all strips. For example, residual motion can be computed for only the segments (partial strips).

In some embodiments, an image strip is segmented into a plurality of segments. In some embodiments, an image strip is segmented along a latitudinal direction. In some embodiments, an image strip is segmented into a plurality of segments of unequal dimensions.

In some embodiments, an image strip is segmented a plurality of times. For example, the original image may be segmented multiple times, or segments can be further segmented. Road profiles can then be computed for all or some of the segmented strips.

Figure 10A:
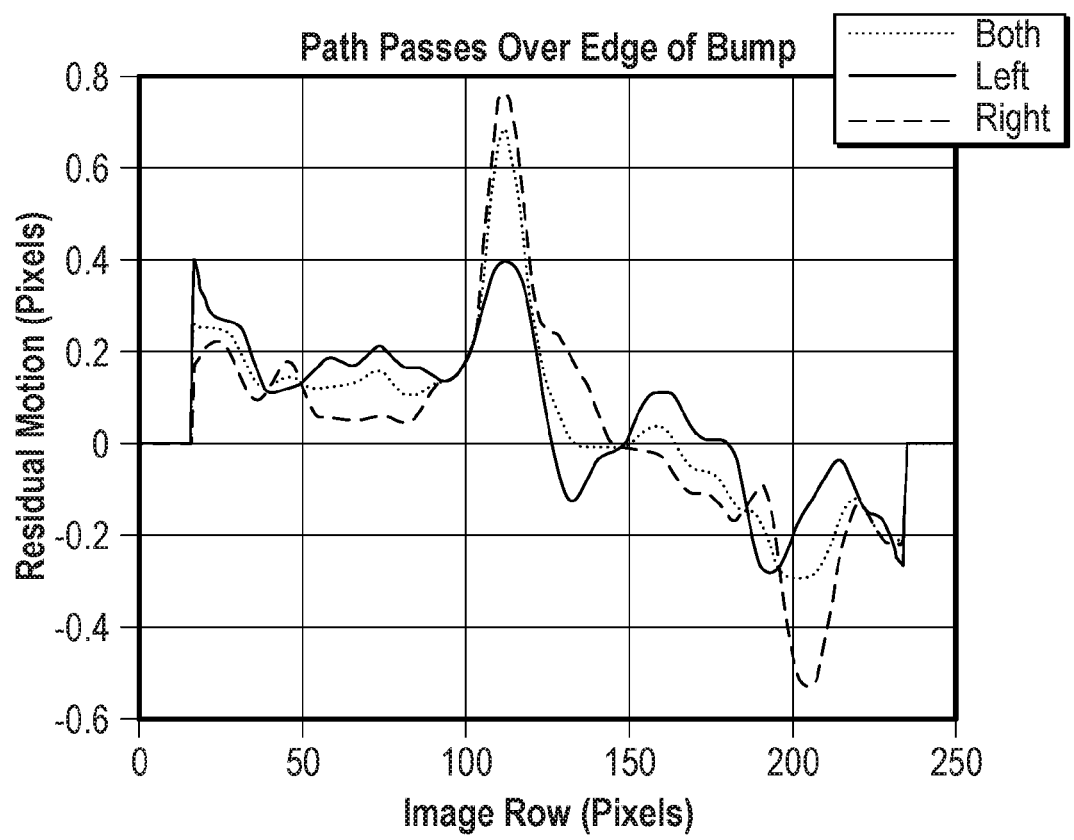
FIG. 10A depicts plots of residual motion of a vehicle path computed for a whole image strip, and for the left and right parts of the strip separately, when the path is over the center of a speed bump.
Figure 10B:
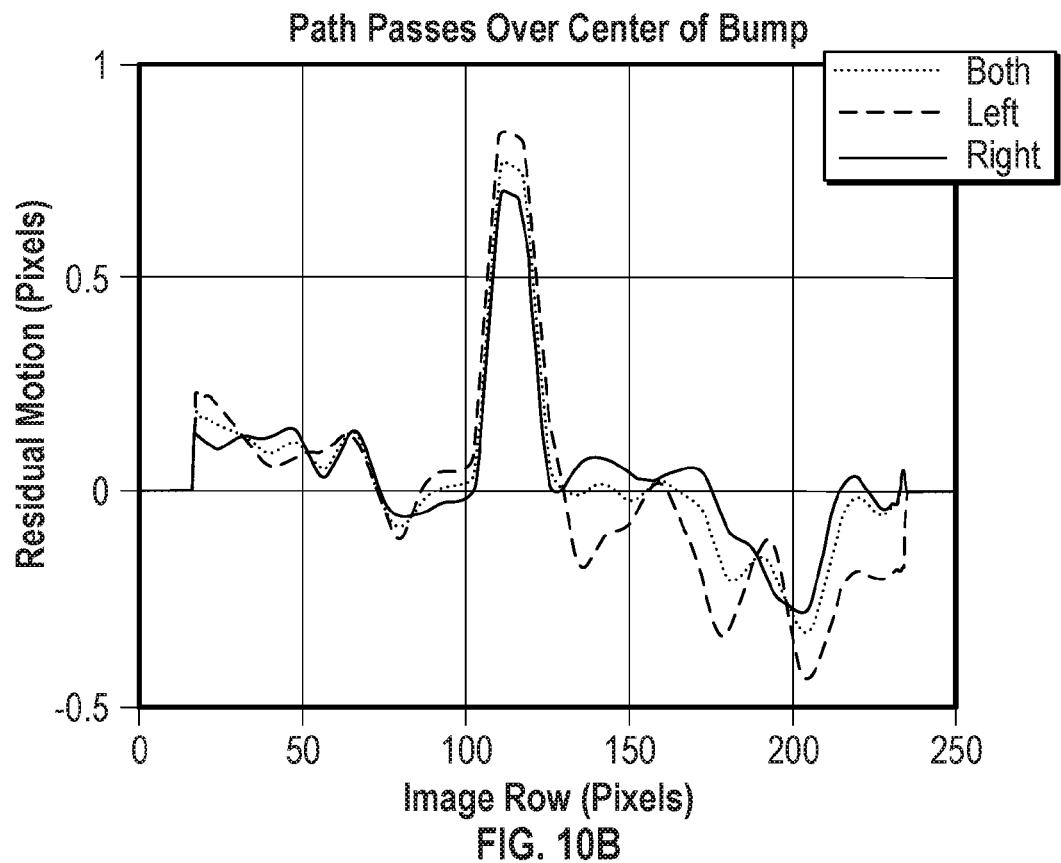
FIG. 10B depicts plots of residual motion f a vehicle path computed for a whole image strip, and for the left and right parts of the strip separately, when the path is over the edge of a speed bump.

FIGS. 10A and 10B show the profile results (in units of pixels) computed for a whole strip ("both") and for left and right parts of the strip separately that resulted from segmenting the whole image strip.

FIG. 10A corresponds to the second example (FIG. 8) in which the path passes over the edge of the bump. In this case, the left and right segments give distinctly different profiles. The profile for the whole (unsegmented) strip is close to the profile of the right strip which is wholly on the bump. However, the right strip and whole strip profiles are much different (e.g., have much larger values of residual motion than) the profile for the left strip. A difference between residual motion of the left and right strips can indicate that the vehicle's path passes over a lateral slope. In this example, the vehicle path passes over the edge of the speed bump, so the lateral slope is the result of the speed bump transitioning into flat road (e.g., when looking from the right strip to the left strip).

For the sake of comparison, FIG. 10B corresponds to the first example (FIG. 5A), in which the path passes over the center of the bump. As can be seen, all three profiles in FIG. 10A are similar and the profile for the whole strip effectively appears to be an average of the left and right strips.

In some embodiments, once the three profiles are computed they are compared. The comparison can be done in units of residual motion (pixels) or the residual motion can be converted into height measurements and the heights can be compared. In some embodiments, comparing profiles includes determining whether residual motion (or height) of each of the road profiles is within a threshold value of each other. For example, using the residual motion the system determines whether all three measurements, for a particular row, agree within 0.25 pixels. If not, in some examples a confidence associated with the road profile and/or residual motion of the road profile is reduced.

In some embodiments, a representation of the lateral slope of the obstacle is determined and provided as output. In some embodiments, the representation of the lateral slope includes a direction of the slope. In some embodiments, a bitwise representation of the slope is computed. For example, using 2 bits (0 and 1): '00' means all measurements agree within a threshold, '10' means that: (left−right)>(threshold), '01' means that (right−left)>(threshold), and '11' might mean that the profile for "both" (whole strip) is significantly greater or smaller than the profiles for both "left" and "right". The last scenario ('11') indicates some sort of error since typically the residual motion of "both" is somewhere in between the "left" and "right" strips, and in some examples, a confidence value may be reduced in response.

In some embodiments, after converting residual motions to metric heights, a metric difference is computed. For example, a difference in a metric height of re left strip and a metric height of the right strip profiles is computed. In some examples, the difference is taken between the two profiles at the same row of pixels along each of the left strip's and right strip's profiles (e.g., at approximately the same lateral distance away from the vehicle for both segments). In other examples, the difference computed may be the greatest difference between any two heights along the left and right strip profiles. A difference can be taken between any two suitable points along the profiles of the segmented strips.

In some embodiments, the representation of the lateral slope includes an actual slope value. In some examples, the slope value is expressed as an angle. In the example image strips depicted in FIG. 9, the centers of the left and right segment paths are 15 pixels apart. Given the distance for each row (of pixels), this pixel value can be converted to actual metric distance between image strip segment centers. For example, at a distance of 10 meters from the vehicle, a separation of 15 pixels might be equivalent to 10 centimeters. Given a profile height difference of 5 centimeters, and a lateral distance between the centers of the two segment paths of 9 centimeters, will mean a lateral slope of 5/9 ($\approx$20.555556). In some examples, the lateral distance used to compute slope is derived another way (e.g., not the center of two segment paths). Any suitable technique is intended to be within the scope of this disclosure. Techniques for determining metric lengths from visual data using a homography are well known. Any suitable method for determining a metric height and width can be used to determine a slope value for a detected obstacle. In some examples, a slope value is determined using pixel values.

In some embodiments, the road profile system outputs all three profiles. In some embodiments, the road profile system outputs all three heights if there is significant difference and a controller further downstream can make decisions. In some embodiments, fewer than all profiles computed are output.

Efficient Computation

Various techniques can be used to increase the efficiency of computation of road profile output in accordance with the embodiments described above. Preferably, computation of the plurality of profiles, such as the three profiles in the examples above ("left" strip, "right" strip, and "both"), is performed efficiently. Further, heavy computation is preferably minimized (e.g., performed once).

In some examples, the warp of a second image frame towards a first image frame and any preprocessing (such as rank transform, low or high pass filtering) is done once, before the strips are split. In some examples, preprocessing is performed on one or more image frames in order to reduce noise, increase textures in the images, or for any other appropriate reason to aid the image processing techniques to be performed using the image frames.

In some embodiments, other computations can be shared between processes. In some examples, sum of the squared difference (SSD) is used for alignment of the first and second image frames. For example, the SSD score for a patch of 15 rows by 31 columns can be computed by adding the SSD score for the same 15 rows summed over the left columns and the SSD score summed over the right columns. Restated, SSD scores for partial image strips can be calculated then combined to arrive at the score for the whole image strip, avoiding performing the SSD operation again on the combined image strip. Thus, there is no significant additional computation up to this stage. The result is three score arrays, such as shown in FIG. 3, for almost the cost of one.

In some embodiments, a peak in the normalized correlation score of a road profile is determined first to the nearest integer and then to subpixel using a parabolic interpolation.

The final stage of searching each row in the score array for a subpixel local maximum is replicated three times. In some examples, some parts of the computation, such as computing the confidence of each row, can be skipped for the partial image strip (e.g., left strip and right strip) profiles. In some examples, computing normalized correlation instead of SSD is similar in terms of efficiency since the vectors $\Sigma I_1$, $\Sigma I_1^2$, $\Sigma I_2$, $\Sigma I_2^2$, and $\Sigma I_1 I_2$ for the whole strip are, again, simply sums of left and right. Similarly, a sum of absolute differences (SAD) computation can be used instead of SSD.

In some examples, some of the computation of subpixel local maxima can be used if computation cycles are at a premium. The integer local maximum for the whole strip can be used to select points for subpixel computation of the left and right strips. For example, subpixel computation can be performed for portions of a profile likely to represent an obstacle on a road surface (e.g., local maxima).

One can also use three single frame profiles in the multi-frame profile computation described above. In some examples, all three measurements can be used to compute a multi-frame median. To save computation, one can perform the stochastic descent using only the profile from the whole strip and align the others using same slope and offset values.

Lateral Slope Output

The determination of a lateral slope associated with a feature on a road surface can be used by a driver assistance system in a variety of ways. In some embodiments, one or more road profiles are provided as output. For example, the output may be provided to one or more driver assistance systems. In some embodiments, the output includes a direction and/or value of a lateral slope. In some examples, the driver assistance system causes the adjustment of a vehicle component setting based in part on a result of the output. Thus, comparison of the road profile of the image strip with the segmented image strips is used to produce actionable data for a driver assistance system.

In some embodiments, adjustment is made to a vehicle steering setting to modify the vehicle path, wherein the modified vehicle path avoids passing over the bump on the road surface. For example, the vehicle may be controlled such that it avoids having its wheel pass over the edge of the speed bump.

In some embodiments, adjustment is made to a vehicle suspension setting. For example, the vehicle may adjust suspension components to prepare for the wheel to come into contact with the laterally-sloped surface, in order to ensure safety and comfort.

In some embodiments, the driver assistance system outputs the road profile information and/or lateral slope information to one or more higher-level systems that mate appropriate decisions for vehicle control.

Output Over an Automotive Communication BUS

In some embodiments, the output of a system performing the techniques described herein can be communicated to the suspension controller of the vehicle of the vehicle communication BUS, such as CAN BUS or FlexRay. It should be appreciated that these are merely provided as examples of a vehicle communication BUS, and that any other type of appropriate communication BUS can be used.

In the CAN BUS example, the data needs to be packaged into a series of 8 byte messages. Consider now transmitting a road profile extending from 5.00 m to 14.95 m. In this example, a system outputs a profile point every 5 cm, resulting in 200 points. The height value between −0.31 m to 0.32 m at 0.0025 m resolution can be coded into 8 bits. We can reserve 4 bits for a confidence value, one 1 bit for the presence of a bump, and 3 bits for lateral slope. This allows for 3 values for left/right slope and 3 values for right/left slope, 000 can indicate negligible slope and 111 can indicate an error detected by the lateral slope calculation such as residual for the full strip being outside the range of the residual motion for the left and right partial strips.

For example, the following table (Table 1) can be used for the three slope bits. It should be understood that Table 1 provides merely an example of using one or more bits to represent lateral slope values, and that any other appropriate representation of lateral slope can be used.

TABLE 1

| Code | Slope Size | Slope Direction |
|---|---|---|
| 000 | No Slope | N/A |
| 001 | Small | R > L |
| 010 | Medium | R > L |
| 011 | Large | R > L |
| 100 | Large | L > R |
| 101 | Medium | L > R |
| 110 | Small | L > R |
| 111 | Error | N/A |

In the example shown in Table 1, "Large" means greater than 1/1 (e.g., the slope value), "Medium" means between 1/1 and 1/2, "Small" means between 1/5 and "No Slope" means the slope is smaller than 1/5. Thus, 200 points at 2 bytes each is 400 bytes or 50 CAN messages for each profile.

Other Techniques for Computing Lateral Slope

Any other appropriate techniques for computing an indication of lateral slope are intended to be within the scope of this disclosure. For example, a computed dense structure of the whole road surface could be used. Under this example, a system can: compute dense structure of the whole road surface (e.g., using multi camera stereo or structure from motion); determine the vehicle path along the surface; determine the profile as the height along the path (in camera coordinates or in the road reference plane coordinates); and determine lateral slope as the lateral change in height of points to the left and right of the path.

In some embodiments, image shear is used to compute lateral slope. An example of this process is provided in greater detail below.

Using Shear to Compute Lateral Slope

The lateral slope at a point along the path can be computed in an alternative way using image shear. Consider a patch 17 rows and 31 pixels wide centered vertically around the point. Instead of just looking for a vertical shift v that will best align the patches derived from the current to the previous images, a system can look for two parameters: a constant $v_0$ for the whole patch and a parameter $v_x$ that multiplies the x coordinate:

$$v(x)=v_0+v_x(x) \quad (1)$$

Using Horn and Schunk Brightness Constraint (see, e.g., B. K. P. Horn and B. G. Schunck, "Determining optical flow." *Artificial Intelligence*, vol. 17, pp. 185-203, 1981.):

$$uI_x+vI_y+I_t=0 \quad (2)$$

and setting u=0 because we align only in the vertical direction and setting $v(x)=v_0+v_x x$ where x is the column of the 31 pixel wide strip from x=−15 to 15, we get:

$$(v_0+v_x x)I_y+I_t=0 \quad (3)$$

To solve for the $v_0$ and $v_x$ we can use least squares over the whole patch following Lukas and Kanade (see, e.g., B. D. Lucas and T. Kanade (1981), *An iterative image registration technique with an application to stereo vision*. Proceedings of Imaging Understanding Workshop, pp. 121-130.), but replace motion (u, v) in x and y (respectively) with $v_0$ and $v_x$, motion in y and shear (respectively). We find $v_0$ and $v_x$ that minimize the SSD score over the whole patch:

$$E = \sum_{x,y} ((v_0 + v_x x)I_y + I_t)^2 \quad (4)$$

The solution is given by:

$$\begin{pmatrix} v_0 \\ v_x \end{pmatrix} = -\begin{pmatrix} \sum I_y^2 & \sum xI_y^2 \\ \sum xI_y^2 & \sum x^2 I_y^2 \end{pmatrix}^{-1} \begin{pmatrix} \sum I_y I_t \\ -\sum xI_y I_t \end{pmatrix} \quad (5)$$

A large absolute value of $v_x$ indicates a significant slope and the sign indicates a slope down from left to right or from right to left. The interpretation of $v_x$ as a slope angle depends on the row of the strip.

Figure 11:
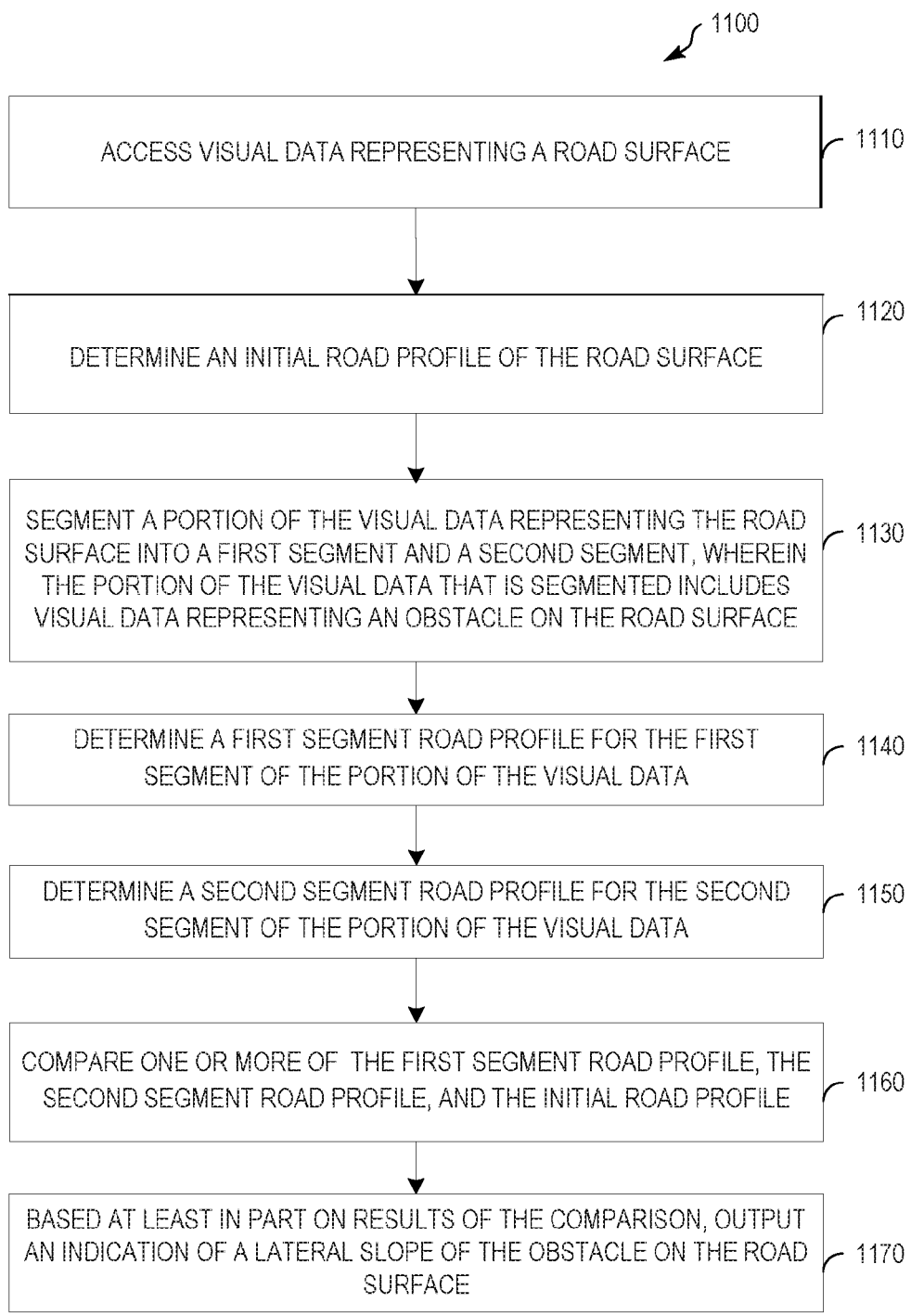
FIG. 11 depicts is a flow diagram illustrating an exemplary process for processing visual data of a road surface.

FIG. 11 depicts a flow diagram illustrating an exemplary process 1100 for processing visual data of a road plane, in accordance with some embodiments. In some embodiments, process 1100 is performed by one or more computing devices and/or systems (e.g., system 1200).

At block 1110, visual data representing a road surface is accessed.

At block 1120, an initial road profile of a road surface is deter In some embodiments, the initial the road profile is derived from residual motion along a vehicle path associated with the road surface.

At block 1130, a portion of the visual data representing the road surface is segmented into a first segment and a second segment. In some embodiments, the portion of the visual data that is segmented includes visual data representing an obstacle on the road surface.

At block 1140, a first segment road profile for the first segment of the portion of the visual data is determined.

At block 1150, a second segment road profile for the second segment of the portion of the visual data is determined.

At block 1160, one or more of the first segment road profile, the second segment road profile, and the initial road profile are compared.

At block 1170, based at least in part on results of the comparison, an indication of a lateral slope of the obstacle on the road surface is outputted.

Figure 12:
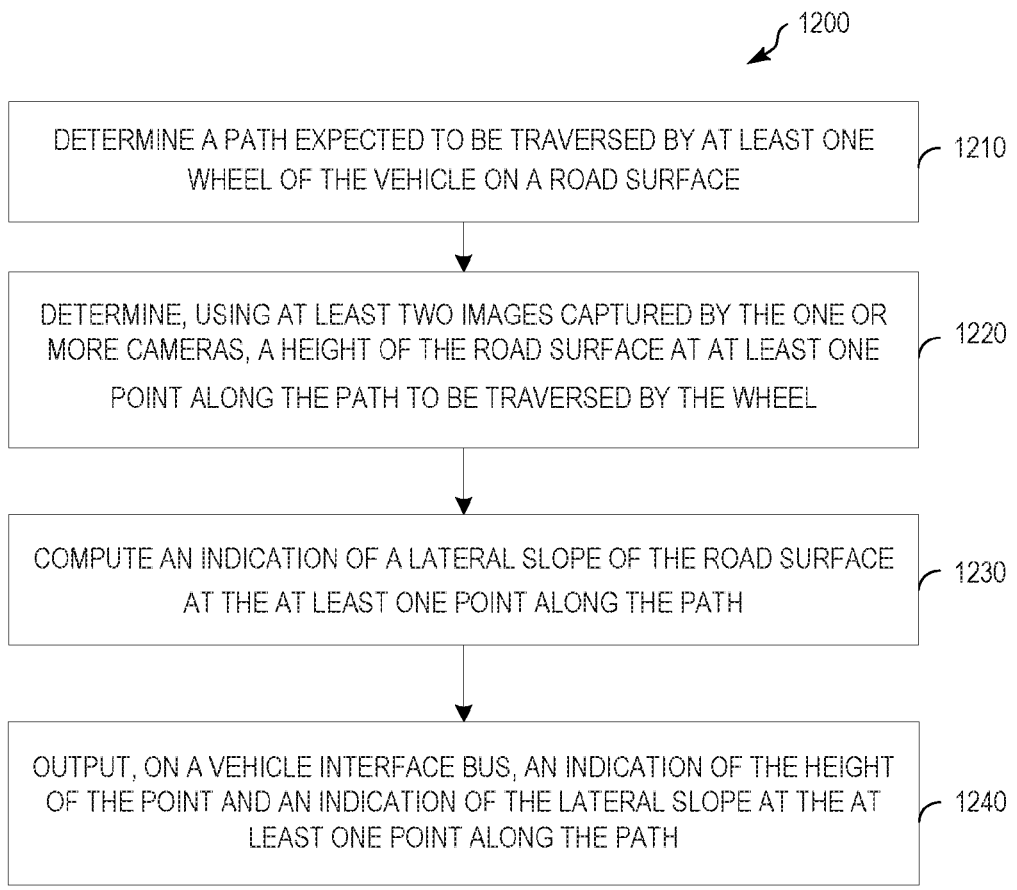
FIG. 12 depicts is a flow diagram illustrating an exemplary process for processing visual data of a road surface.

FIG. 12 depicts a flow diagram illustrating an exemplary process 1200 for processing visual data of a road plane, in accordance with some embodiments. In some embodiments, process 1200 is performed by one or more computing devices and/or systems (e.g., system 1200).

At block 1210, a path expected to be traversed by at least one wheel of the vehicle on a road surface is determined.

At block 1220, using at least two images captured by the one or more cameras, a height of the road surface for at least one point along the path to be traversed by the wheel is determined.

At block 1230, an indication of a lateral slope of the road surface at the at least one point along the path is computed.

At block 1240, an indication of the height of the point and an indication of the lateral slope at the at least one point along the path is output on a vehicle interface bus.

In some embodiments, using at least two images, the height of the road at two points on the path to be traversed by the wheel, laterally displaced from one another and at substantially the same distance along the path, is determined. In some embodiments, an indication of the lateral slope of the road surface is computed based in part on the comparing the height of the road surface at the two points.

In some embodiments, at least one of the two points is a point along a computed road profile. In some embodiments, the two points are along two computed road profiles. For example, each point of the two points can be on a separate road profile.

In some embodiments, the at least one point is two or more points. In some embodiments, the at least one point is five or more points.

In some embodiments, the at least two images were captured from a single camera at different times. In some embodiments, the second image is captured after the vehicle has moved at least a minimum distance from the vehicle location where the first image was captured.

In some embodiments, the minimum distance is adjustable. For example, the minimum distance from the vehicle location where the first image was captured can be changed based on one or more factors (e.g., vehicle speed). In some embodiments, the minimum distance is at least 0.3 meters. It should be appreciated that other minimum distances can be used.

In some embodiments, the at least two images captured were captured using two cameras. For example, one image may is captured by a first camera and a second image is captured by a second camera. In some embodiments, the two cameras are displaced laterally if the vehicle. In some embodiments, at least one camera of the two cameras is mounted on a windshield of the vehicle.

In some embodiments, the indication of the lateral slope indicates whether the heights to the left and right of the point are substantially the same. For example, the indication of the lateral slope can indicate that adjacent points in two directions are approximately the same height as the point.

In some embodiments, the indication of the lateral slope indicates whether the height to the left of the point is substantially greater than the height to the right of the point. For example, the indication of the lateral slope can indicate that there is a downward slope from the left of the point to the right of the point.

In some embodiments, the indication of the lateral slope indicates whether the height to the left of the point is substantially smaller than the height to the right of the point. For example, the indication of the lateral slope can indicate that there is a downward slope from the right of the point to the left of the point.

In some embodiments, the indication of the lateral slope is the angle of the slope. In some embodiments the angle of the slope is indicated with 5 or more possible values. In some embodiments, the angle of the slope is indicated with an integer number of values. For example, the angle of the slop can be indicated by combinations of bits (e.g., 000, 001, 010, or the like).

Figure 13:
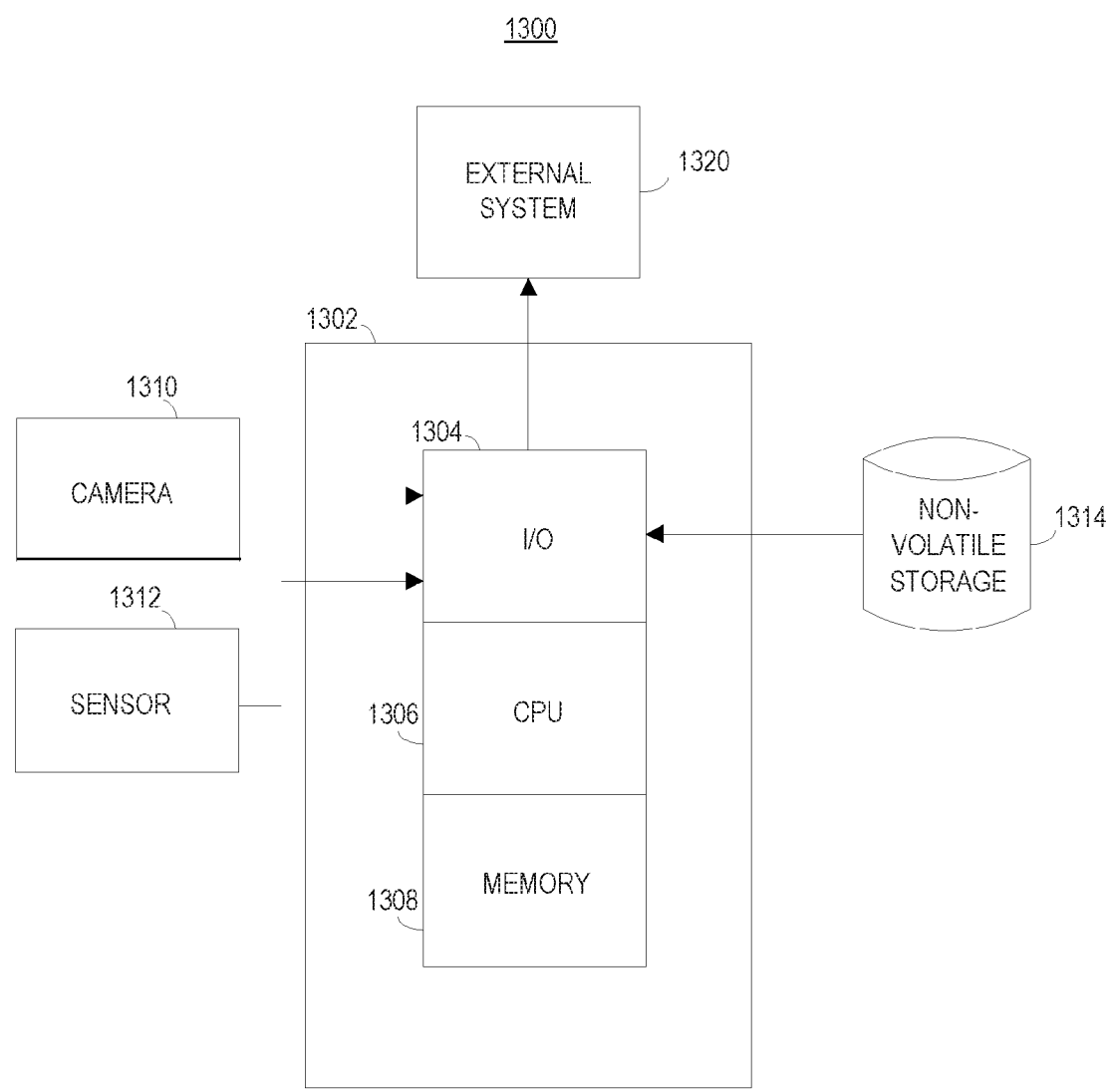
FIG. 13 depicts an exemplary system for processing visual data of a road surface.

FIG. 13 depicts components of an exemplary computing system 1300 configured to perform any one of the above-described processes. In some embodiments, computing system 1300 is a vehicle computer, module, component, or the like. Computing system 1300 may include, for example, a processing unit including one or more processors, a memory, a storage, and input/output devices (e.g., monitor, touch screen, keyboard, camera, stylus, drawing device, disk drive, USB, Internet connection, near-field wireless communication, Bluetooth, etc.). However, computing system 1300 may include circuitry or other specialized hardware for carrying out some or all aspects of the processes (e.g., process 1100 and/or process 1200). In some operational settings, computing system 1300 may be configured as a system that includes one or more units, each of which is configured to carry out some aspects of the processes in software, hardware, firmware, or some combination thereof.

In computing system 1300, the main system 1302 may include an input/output ("I/O") section 1304, one or more central processing unit ("CPU") 1306, and a memory section 1308. Memory section 1308 may contain computer-executable instructions and/or data for carrying out at least portions of process 1100. The I/O section 1304 is optionally connected to one or more camera 1310, one or more sensor 1312, a non-volatile storage unit 1314, or one or more external system 1320. For example, an external system 1320 may be another vehicle control component or system, or the like. The I/O section 1304 may also be connected to other components (not illustrated) that can read/write non-transitory, computer-readable storage medium, which can contain programs and/or data.

At least some values based on the results of the above-described processes can be saved for subsequent use. Additionally, a non-transitory, computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A system mounted on a host vehicle, the system comprising:
   one or more cameras; and
   one or more processors, wherein the one or more processors are configured to execute instructions to:
      determine a path expected to be traversed by at least a first wheel of the host vehicle on a road surface;
      determine, using at least two images captured by one or more cameras on the host vehicle, a height of the road surface for at least a first point located along the path expected to be traversed by the first wheel;
      compute an indication of a lateral slope of the road surface at the first point; and
      output, on a vehicle interface bus, an indication of the height of the first point and an indication of the lateral slope of the road surface at the first point, wherein the road surface comprises the road surface and any stationary object on or under the road surface.

2. The system according to claim 1, wherein the one or more processors are configured to execute instructions to cause a system response based on the lateral slope of the road surface at the first point and based on the height of the road surface at the first point.

3. The system according to claim 2, wherein system response includes one of: steering the host vehicle or adjusting a suspension of the host vehicle.

4. The system according to claim 1, wherein to determine the height of the road surface at the first point, the one or more processors are configured to execute instructions to:
derive an initial road profile from a residual motion of the road surface along the path; and
compute a residual motion for the first point.

5. The system according to claim 1, wherein the one or more processors are configured to execute instructions to determine, using at least two images captured by the one or more cameras on the host vehicle, a height of each one of a plurality of points located along the path expected to be traversed by the first wheel.

6. The system according to claim 5, wherein at least one of the plurality of points is on a stationary object on the road surface and at least one of the plurality of points is not on the stationary object.

7. The system according to claim 1, wherein the one or more processors are configured to execute instructions to determine a height of the road surface at a second point located along the path expected to be traversed by the first wheel, wherein the first point and the second point are laterally displaced from one another.

8. The system according to claim 7, wherein the one or more processors are configured to execute instructions to compute a height difference between the first point and the second point.

9. The system according to claim 1, wherein the road surface includes a speed bump and a pothole.

10. The system according to claim 1, wherein the one or more processors are configured to execute instructions to determine a direction of the lateral slope.

11. The system according to claim 1, wherein the lateral slope at the first point indicates an expected height difference between two or more points over which the first wheel is expected to be located ahead of a current location of the host vehicle.

12. A method of processing visual data of a road surface of an environment of a host vehicle, the method comprising:
determining a path expected to be traversed by at least a first wheel of the host vehicle on a road surface;
determining, using at least two images captured by one or more cameras on the host vehicle, a height of the road surface for at least a first point located along the path expected to be traversed by the first wheel;
computing an indication of a lateral slope of the road surface at the first point; and
outputting, on a vehicle interface bus of the host vehicle, an indication of the height of the first point and an indication of the lateral slope of the road surface at the first point,
wherein the road surface comprises the road surface and any stationary object on or under the road surface.

13. The method according to claim 12, further comprising causing a system response based on the lateral slope of the road surface at the first point and based on the height of the road surface at the first point.

14. The method according to claim 13, wherein system response includes one of: steering the host vehicle or adjusting a suspension of the host vehicle.

15. The method according to claim 12, wherein determining the height of the road surface at the first point comprises:
deriving an initial road profile from a residual motion of the road surface along the path; and
computing a residual motion for the first point.

16. The method according to claim 12, further comprising determining, using at least two images captured by the one or more cameras on the host vehicle, a height of each one of a plurality of points located along the path expected to be traversed by the first wheel.

17. The method according to claim 16, wherein at least one of the plurality of points is on a stationary object on the road surface and at least one of the plurality of points is not on the stationary object.

18. The method according to claim 12, further comprising determining a height of the road surface at a second point located along the path expected to be traversed by the first wheel, wherein the first point and the second point are laterally displaced from one another.

19. The method according to claim 18, further comprising computing a height difference between the first point and the second point.

20. The method according to claim 12, wherein the road surface includes a speed bump and a pothole.

21. The method according to claim 12, further comprising determining a direction of the lateral slope.

22. The method according to claim 12, wherein the lateral slope at the first point indicates an expected height difference between two or more points over which the first wheel is expected to be located ahead of a current location of the host vehicle.

23. A non-transitory computer-readable storage medium storing one or more programs, the one or more programs comprising instructions, which, when executed by one or more processors of a host vehicle, cause the processors to:
determine a path expected to be traversed by at least a first wheel of the host vehicle on a road surface;
determine, using at least two images captured by one or more cameras on the host vehicle, a height of the road surface for at least a first point located along the path expected to be traversed by the first wheel;
compute an indication of a lateral slope of the road surface at the first point; and
output, on a vehicle interface bus of the host vehicle, an indication of the height of the first point and an indication of the lateral slope of the road surface at the first point,
wherein the road surface comprises the road surface and any stationary object on or under the road surface.

24. A method of processing visual data of an environment of a host vehicle, the method comprising:
determining a path expected to be traversed by a first wheel of the host vehicle;
determining, using at least two images captured by one or more cameras on the host vehicle, a height of a first point located along the path to expected be traversed by the first wheel and a height of a second point along the path to be traversed by the first wheel, wherein the second point is a point over which the first wheel is expected to pass while the first wheel is over the first point; and
causing a system response based on the height at the first point and the height at the second point.

25. The method according to claim 24, wherein the first point and the second point are laterally displaced from one another.

26. The method according to claim 24, wherein the first point and the second point indicate an expected height difference between two or more points over which the first wheel is expected to be located ahead of a current location of the host vehicle.

27. The method according to claim 24, wherein system response includes one of: steering the host vehicle or adjusting a suspension of the host vehicle.

28. The method according to claim 24, wherein determining the height of the first point comprises:
deriving an initial road profile from a residual motion of a road surface along the path; and
computing a residual motion for the first point.

29. The method according to claim 24, wherein at least one of the first or second points is on a stationary object on a road surface and at least one of the first or second points is not on the stationary object.

30. The method according to claim 29, wherein the road surface includes a speed bump and a pothole.

31. A system mounted on a host vehicle, the system comprising:
one or more cameras; and
one or more processors, wherein the one or more processors are configured to execute instructions to:
determine a path expected to be traversed by a first wheel of the host vehicle;
determine, using at least two images captured by one or more cameras on the host vehicle, a height of a first point located along the path to expected be traversed by the first wheel and a height of a second point along the path to be traversed by the first wheel, wherein the second point is a point over which the first wheel is expected to pass while the first wheel is over the first point; and
cause a system response based on the height at the first point and the height at the second point.

32. The system according to claim 31, wherein the first point and the second point are laterally displaced from one another.

33. The system according to claim 31, wherein the first point and the second point indicate an expected height difference between two or more points over which the first wheel is expected to be located ahead of a current location of the host vehicle.

34. The system according to claim 31, wherein system response includes one of: steering the host vehicle or adjusting a suspension of the host vehicle.

35. The system according to claim 31, wherein to determine the height of the first point, the one or more processors are configured to execute instructions to:
derive an initial road profile from a residual motion of a road surface along the path; and
compute a residual motion for the first point.

36. The system according to claim 31, wherein at least one of the first or second points is on a stationary object on a road surface and at least one of the first or second points is not on the stationary object.

37. The system according to claim 36, wherein the road surface includes a speed bump and a pothole.

38. A non-transitory computer-readable storage medium storing one or more programs, the one or more programs comprising instructions, which, when executed by one or more processors of a host vehicle, cause the processors to:
determine a path expected to be traversed by a first wheel of the host vehicle;
determine, using at least two images captured by one or more cameras on the host vehicle, a height of a first point located along the path to expected be traversed by the first wheel and a height of a second point along the path to be traversed by the first wheel, wherein the second point is a point over which the first wheel is expected to pass while the first wheel is over the first point; and
cause a system response based on the height at the first point and the height at the second point.

* * * * *